(12) United States Patent
Fougnies et al.

(10) Patent No.: US 10,704,864 B1
(45) Date of Patent: *Jul. 7, 2020

(54) SYSTEM FOR TRACKING A PRESUMED TARGET USING SCOPES THAT ARE REMOTELY LOCATED FROM EACH OTHER

(71) Applicants: Douglas Fougnies, Scottsdale, AZ (US); Robert A. Pressman, Conshohocken, PA (US); Larry L. Day, Scottsdale, AZ (US)

(72) Inventors: Douglas Fougnies, Scottsdale, AZ (US); Robert A. Pressman, Conshohocken, PA (US); Larry L. Day, Scottsdale, AZ (US); Taylor J. Carpenter, Philadelphia, PA (US); Mark J. Howell, Tucson, AZ (US)

(73) Assignees: Douglas Fougnies, Scottsdale, AZ (US); Robert A. Pressman, Conshohocken, PA (US); Larry L. Day, Scottsdale, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/741,226

(22) Filed: Jan. 13, 2020

Related U.S. Application Data

(63) Continuation of application No. 16/531,869, filed on Aug. 5, 2019, now Pat. No. 10,533,826, which is a
(Continued)

(51) Int. Cl.
*F41G 3/02* (2006.01)
*G01S 19/13* (2010.01)
(Continued)

(52) U.S. Cl.
CPC ............. *F41G 3/02* (2013.01); *F41G 1/38* (2013.01); *G01C 17/00* (2013.01); *G01S 19/13* (2013.01); *G01S 19/47* (2013.01); *H04W 84/18* (2013.01)

(58) Field of Classification Search
CPC ... F41G 3/02; F41G 1/38; G01S 19/13; G01S 19/47; G01C 17/00; H04W 84/18
(Continued)

(56) References Cited

U.S. PATENT DOCUMENTS 4,255,013 A   3/1981   Allen
4,418,487 A   12/1983  Strahan
(Continued)

OTHER PUBLICATIONS

U.S. Appl. No. 16/700,576, Pending, not yet examined.
(Continued)

*Primary Examiner* — Daryl C Pope
(74) *Attorney, Agent, or Firm* — Panitch Schwarze Belisario & Nadel LLP

(57) ABSTRACT

A network of scopes, including one or more lead scopes and one or more follower scopes, is provided to allow the respective scopes to track the same presumed target. A lead scope locates a target and communicates target position data of the presumed target to the follower scope. The follower scope uses the target position data and its own position data to generate electronic control signals for use by follower scope to make position movements so as to re-position the follower scope from its current target position to move towards the target position defined by the target position data received from the lead scope. At least the second scope is mounted to, or integrated into, a vehicle, which uses the target position data to move to a new location so as to allow the second scope to better view the target.

22 Claims, 19 Drawing Sheets

Related U.S. Application Data continuation of application No. 16/272,733, filed on Feb. 11, 2019, now Pat. No. 10,408,573, which is a continuation-in-part of application No. 16/057,247, filed on Aug. 7, 2018, now Pat. No. 10,267,598.

(60) Provisional application No. 62/544,124, filed on Aug. 11, 2017.

(51) Int. Cl.
*G01C 17/00* (2006.01)
*G01S 19/47* (2010.01)
*F41G 1/38* (2006.01)
*H04W 84/18* (2009.01)

(58) Field of Classification Search
USPC .............................. 340/539.1, 539.11, 539.13
See application file for complete search history.

(56) References Cited

U.S. PATENT DOCUMENTS

| | | | |
|---|---|---|---|
| 4,531,321 A | 7/1985 | Bechtel | |
| 4,905,396 A | 3/1990 | Bechtel | |
| 4,949,089 A | 8/1990 | Ruszkowski, Jr. | |
| 5,052,790 A | 10/1991 | Edwards et al. | |
| 5,568,152 A | 10/1996 | Janky et al. | |
| 6,269,581 B1 | 8/2001 | Groh | |
| 6,862,833 B1 | 3/2005 | Gurtner | |
| 8,001,714 B2 | 8/2011 | Davidson | |
| 9,612,088 B2 | 4/2017 | Theriault | |
| 9,813,618 B2 | 11/2017 | Griffis et al. | |
| 10,267,598 B2 | 4/2019 | Fougnies et al. | |
| 10,408,573 B1 | 9/2019 | Fougnies et al. | |
| 2003/0140545 A1* | 7/2003 | Huber | F41G 1/38 |
| | | | 42/122 |
| 2004/0134113 A1 | 7/2004 | Deros et al. | |
| 2007/0050139 A1 | 3/2007 | Sidman | |
| 2012/0236031 A1 | 9/2012 | Haddick et al. | |
| 2012/0320456 A1 | 12/2012 | Fujimoto et al. | |
| 2013/0187834 A1 | 7/2013 | Nohara | |
| 2013/0250284 A1 | 9/2013 | Lienhart et al. | |
| 2014/0157646 A1 | 6/2014 | McHale et al. | |
| 2014/0184788 A1 | 7/2014 | McHale et al. | |
| 2014/0281851 A1 | 9/2014 | McHale | |
| 2015/0345905 A1* | 12/2015 | Hancosky | F41G 1/545 |
| | | | 42/113 |
| 2016/0091282 A1 | 3/2016 | Baker et al. | |
| 2016/0169625 A1 | 6/2016 | Richards | |
| 2016/0327367 A1* | 11/2016 | Porter | F41G 1/54 |
| 2017/0302852 A1 | 10/2017 | Lam | |
| 2018/0188005 A1* | 7/2018 | Porter | F41G 1/473 |
| 2019/0049219 A1 | 2/2019 | Fougnies et al. | |
| 2019/0226806 A1 | 7/2019 | Noller | |
| 2019/0249958 A1 | 8/2019 | Teetzel et al. | |

OTHER PUBLICATIONS

"Bluetooth SIG Adds Mesh Networking to BLE Ecosystem," posted on Jul. 17, 2017 by Circuit Cellar Staff, 2 pages, downloaded from web page: http://circuitcellar.com/cc-blog/bluetooth-sig-adds-mesh-networking-to-ble-ecosystem/.

Data Sheet for "TinymeshTM RF Transceiver Modules" RC11xx(HP)TM, RC25xx(HP)TM, RC17xx(HP)TM, Radiocrafts AS and Tinymesh, both located in Norway, downloaded from web page: https://radiocrafts.com/uploads/RCxxxxHP-TM_Data_Sheet.pdf, Copyright © 2016 Radiocrafts AS and Tiny Mesh AS, 86 pages.

Freedom on the Move (FOTM) Functional Overview, Copyright © 2017 Strongwatch | Freedom Surveillance, LLC, Last revised: Jun. 2018, 14 pages.

GOOGLE Cloud Vision API—Image Content Analysis. Downloaded from web page: https://cloud.google.com/vision, download date: Feb. 23, 2018, original posting date: unknown, 7 pages.

International Search Report and Written Opinion dated Oct. 25, 2018 in International Application No. PCT/US2018/046157.

Mathworks® documentation "Convert Earth-centered inertial (ECI) coordinates to azimuth, elevation, slant range (AER) coordinates." Downloaded from web page: https://www.mathworks.com/help/aerotbx/ug/eci2aer.html, download date: Jul. 5, 2018, original posting date: unknown, 6 pages.

Product brochure for "InertialSense® Micro Navigation Systems." Downloaded from web page: https://inertialsense.com/, product release date: unknown, Copyright © 2016, Inertial Sense, LLC, Salem, Utah, 11 pages.

Product description for "Terrain Navigator Pro." Trimble® subsidiary MyTopoTM, Billings, Montana, downloaded from web page: https://www.terrainnavigator.com/ Download date: Jul. 2018, product release date: unknown, 1 page.

VectorNav Technologies—MEMES-based Inertial Sensors. Downloaded from web page: https://www.vectornav.com/, download date: Aug. 9, 2017, product release date: unknown, 4 pages.

VectorNav Technologies, LLC, Dallas, Texas, "VectorNav Launches Dual-Antenna GPS-Aided Inertial Nav System" (VN-300) GPS World, May 13, 2014, downloaded from web page: http://gpsworld.com/vectomav-launches-dual-antenna-gps-aided-inertial-nav-system/, 4 pages.

Wikipedia entry for "Compass." Page last edited Aug. 1, 2018, original posting date: unknown, 11 pages.

Wikipedia entry for "Telescopic Sight." Page last edited Jun. 25, 2018, original posting date: unknown, 14 pages.

* cited by examiner

| Select | Object |
|---|---|
|  | human |
| √ | deer |
|  | vehicle |

FIGURE 5

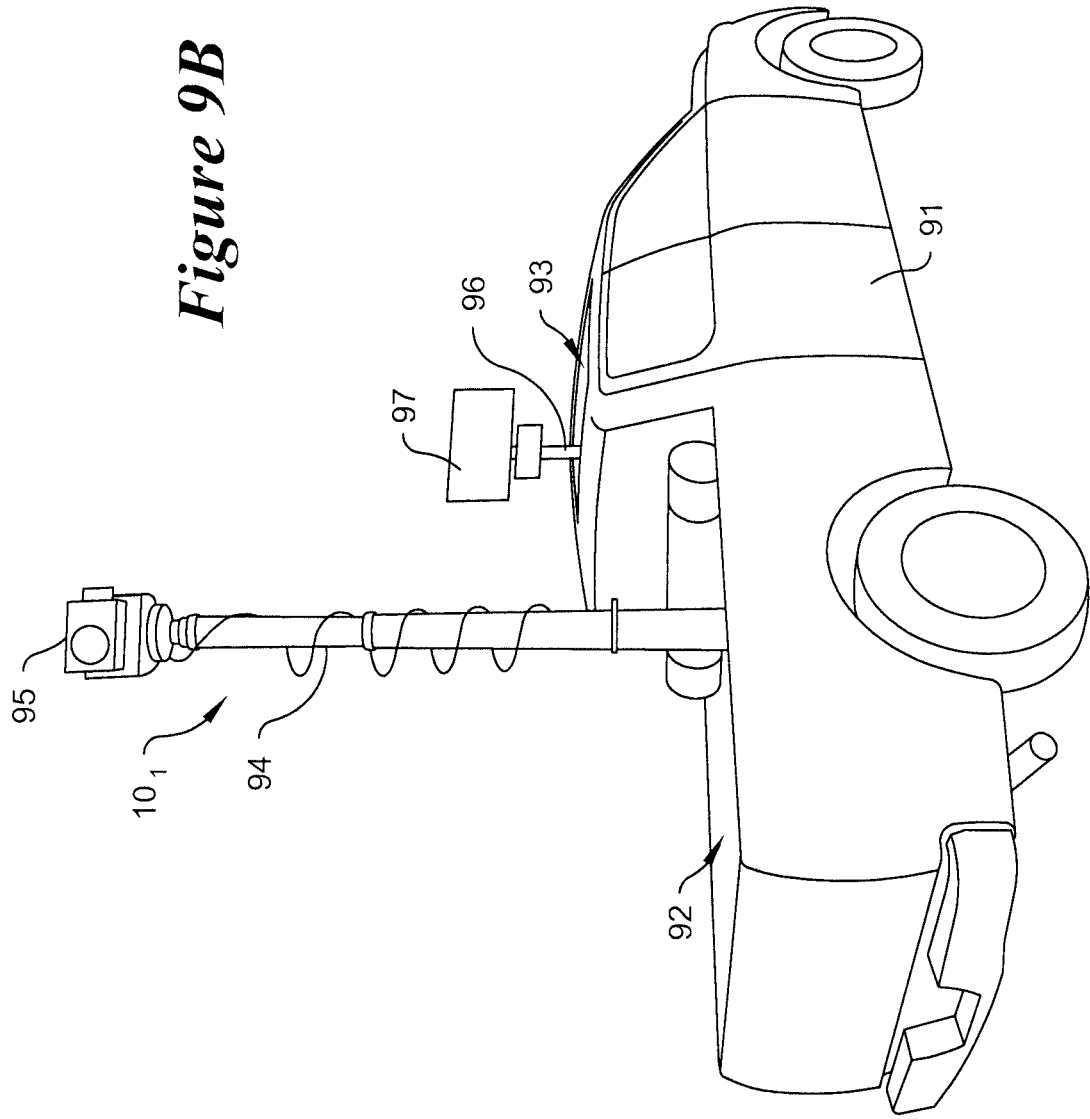

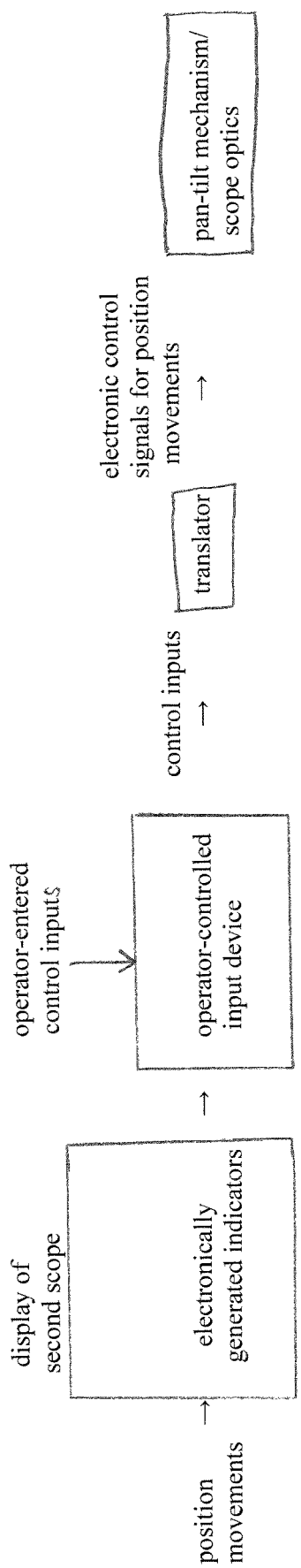
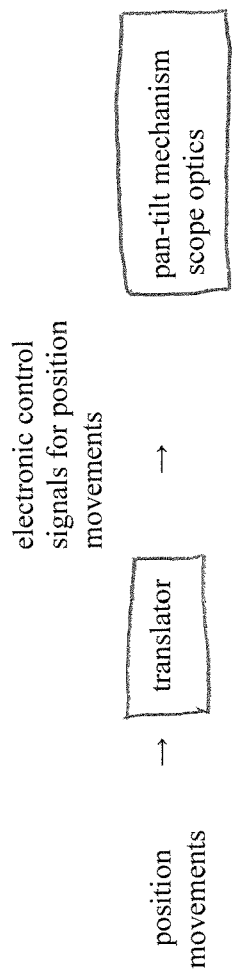
Figure 12A
Figure 12B

SYSTEM FOR TRACKING A PRESUMED TARGET USING SCOPES THAT ARE REMOTELY LOCATED FROM EACH OTHER

CROSS-REFERENCE TO RELATED APPLICATION

This application is continuation of copending U.S. application Ser. No. 16/531,869 filed Aug. 5, 2019, which in turn is a continuation of U.S. patent application Ser. No. 16/272,733 filed Feb. 11, 2019, now U.S. Pat. No. 10,408,573, which in turn, is a continuation-in-part of U.S. patent application Ser. No. 16/057,247 filed Aug. 7, 2018, now U.S. Pat. No. 10,267,598. The disclosures of each of these applications are hereby incorporated by reference in their entirety.

This application claims the benefit of U.S. Patent Application No. 62/544,124, filed Aug. 11, 2017, the disclosure of which is hereby incorporated by reference in its entirety.

BACKGROUND OF THE INVENTION

A sight or optical viewer which incorporate lenses to magnify an image or simply passes through light without magnification, also referred to as a "scope," is a sighting device that is based on an optical refracting telescope or other optical viewing device. It includes some form of graphic image pattern (a reticle or cross-hairs) mounted in an optically appropriate position in its optical system to give an accurate aiming point. Telescopic sights are used with all types of systems that require accurate aiming but are most commonly found on firearms, particularly rifles. A telescopic sight may include an integrated rangefinder (typically, a laser rangefinder) that measures distance from the observer's sighting device to a target.

A compass is an instrument used for navigation and orientation that shows direction relative to the geographic "cardinal directions,", or "points.". A "compass rose" diagram shows the directions north, south, east, and west as abbreviated initials marked on the compass. When the compass is used, the rose can be aligned with the corresponding geographic directions, so, for example, the "N" mark on the rose really points to the north. In addition to the rose or sometimes instead of it, angle markings in degrees may be shown on the compass. North corresponds to zero degrees, and the angles increase clockwise, so east is 90 degrees, south is 180, and west is 270. These numbers allow the compass to show azimuths or bearings, which are commonly stated in this notation.

GPS data typically provides a three-dimensional location (latitude, longitude, and altitude (elevation)). For example, a sample GPS of a location in Philadelphia is as follows:

Latitude: 39.90130859

Longitude: −75.15197754

Altitude (elevation) relative to sea level: 5 m

Miniaturized GPS devices are known that include a GPS receiver for providing GPS location data and an orientation sensor for providing attitude data. The orientation sensor may derive its data from an accelerometer and a geomagnetic field sensor, or another combination of sensors. One such miniaturized GPS device that is suitable for use in the present invention is a device that is commercially available from Inertial Sense, LLC located in Salem, Utah. This device is marketed as "μINS" and "μINS-2." ("INS" is an industry abbreviation for "Inertial Navigation System.") The μINS" and μINS-2 are GPS-aided Inertial Navigation Systems (GPS/INS). A GPS/INS uses GPS satellite signals to correct or calibrate a solution from an inertial navigation system (INS).

Another known miniature GPS/INS that is suitable for use in the present invention is a device that is commercially available from VectorNav Technologies, LLC located in Dallas, Tex. This device is marketed as "VN-300" and is a dual-antenna GPS/INS. The dual-antenna feature in the VN-300 allows it to provide accurate compass data.

Network technology is well known in the art. Each device in a network is often referred to as a node and nodes can be formed into a network using a variety of network topologies including hub and spoke and mesh. In a cellular based communication system, nodes communicate through one or more base stations which in turn are directly or indirectly connected to a mobile switching center (MSC). MSCs are interconnected based on industry standards which enable nodes in a cellular network to communicate with other nodes that are connected to different based stations. There are numerous cellular standards such as GSM, LTE and CDMA and a common feature in cellular networks is the capability of allowing nodes to connect to the Internet.

Broadband satellite communication systems use one or more communication satellites organized into a constellation. There are numerous commercially available satellite systems including systems operated by Globalstar, Iridium and Inmarsat. Like cellular, broadband satellite communication systems allow nodes to connect to the Internet. In cellular terms, each satellite in the constellation acts as a base station and nodes in the system connect to a satellite that is in range. One advantage of satellite systems is that coverage is sometimes better in remote areas.

Wireless Local Area Network (WLAN) technology allows nodes to establish a network. Common WLAN standards including 802.11a, b, g and n. 802.11s is a WIFI based mesh networking standard. Bluetooth® is another standard for connecting nodes in a network and mesh networking capability has recently been added to the Bluetooth LE standard by the Bluetooth Special Interest Group. Accordingly, through various standards, it is possible to implement point to point, point to multipoint and mesh WLAN, all of which are suitable for use with the present invention.

Mesh network topology has significant advantages for mobile devices, particularly in remote areas where there is limited cellular service since each node can be connected to multiple other nodes and there is no required path from any node in the network to any other node. A further advantage of a mesh network is that as long as any one node in the mesh network has access to the Internet such as by way of a cellular or satellite connection, all of the nodes in the mesh network have access.

A representative wireless mesh networking chipset that is suitable for use with the present invention is the RC17xx (HP)™ (Tinymesh™ RF Transceiver Module), which is commercially available from Radiocrafts AS and Tinymesh, both located in Norway. The chipset incorporates the Tinymesh application for the creation of mesh networks. The ideal mesh network chipset for the present invention is small, and has high power and a long range, and should operate in unlicensed spectrum.

SUMMARY OF THE INVENTION

In one preferred embodiment, a network of scopes, including one or more lead scopes and one or more follower scopes, is provided to allow scope operators of the respective scopes to track the same presumed target. A lead scope locates a target and communicates target position data of the presumed target to the follower scope. The follower scope uses the target position data and its own position data to electronically generate indicators for use to prompt the operator of the follower scope to make position movements so as to re-position the follower scope from its current target position to move towards the target position defined by the target position data received from the lead scope.

In another preferred embodiment, a network of scopes, including one or more lead scopes and one or more follower scopes, is provided to allow the respective scopes to track the same presumed target. A lead scope locates a target and communicates target position data of the presumed target to the follower scope. The follower scope uses the target position data and its own position data to electronically generate indicators for use to allow the follower scope to make position movements so as to re-position the follower scope from its current target position to move towards the target position defined by the target position data received from the lead scope. At least the second scope is mounted to, or integrated into, a vehicle, which uses the target position data to move to a new position so as to allow the second scope to better view the target.

BRIEF DESCRIPTION OF DRAWINGS

The foregoing summary as well as the following detailed description of preferred embodiments of the invention, will be better understood when read in conjunction with the appended drawings. For the purpose of illustrating the invention, the drawings show presently preferred embodiments. However, the invention is not limited to the precise arrangements and instrumentalities shown. In the drawings:

FIG. 5 shows a sample preset list that may be displayed on a display of scope in accordance with one preferred embodiment of the present invention.

FIG. 9B is a schematic diagram of a vehicle having vehicle-based devices in the surveillance environment of FIG. 9A.

FIGS. 12A and 12B are schematic diagrams of operator-assisted and fully automated embodiments for scope movement in accordance with preferred embodiments of the present invention.

DETAILED DESCRIPTION OF THE INVENTION

Figure 1A:
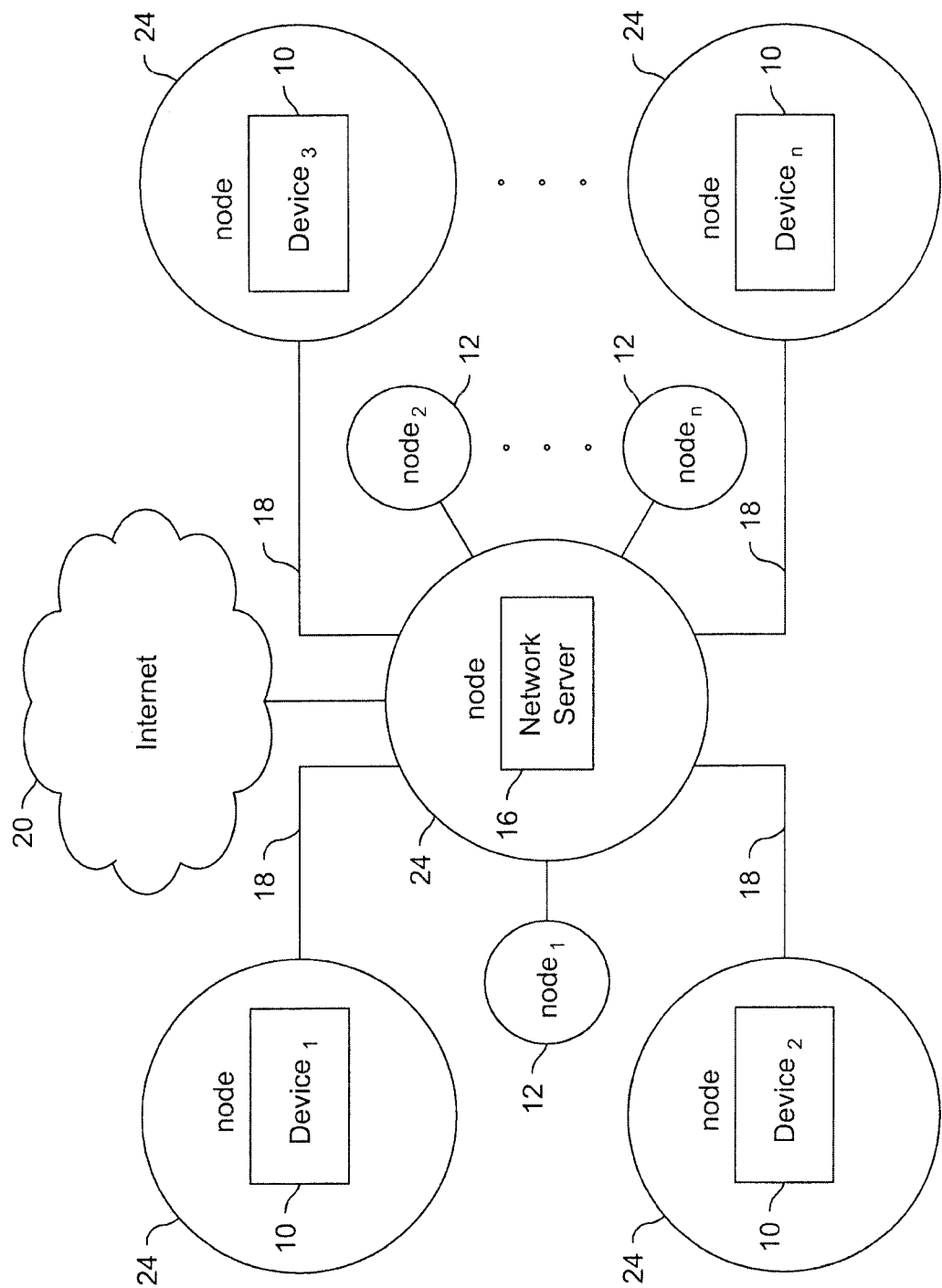
FIGS. 1A, 1B, 2 and 3 are schematic diagrams of system components in accordance with preferred embodiments of the present invention.

Certain terminology is used herein for convenience only and is not to be taken as a limitation on the present invention.

Preferred embodiments of the present invention provide for devices having network-connected scopes which are designed to hone in on the same target, which may be a still or moving target. In a first embodiment involving two scopes, a "lead scope" identifies a target and communicates location data regarding the target to a "follower scope" which uses the location data from the lead scope and its own location and orientation data to hone in the target. In the two scope configuration, the lead scope and the follower scope communicate through any available wireless data communication technology including cellular, satellite or one or more WLAN technologies.

In a second embodiment involving a plurality of scopes, a first scope identifies a target and communicates location data regarding the target to a plurality of other scopes which use the location data from the first scope and their respective location and orientation data to hone in on the target. In this embodiment, as additional scopes locate the target, they communicate their location data regarding the target to a network server which amalgamates location data that is accumulated from each scope that identified the target to define successively more precise location data of the target (i.e., more data points increase the precision of the location), which is then communicated to the scopes that have not yet located the target. The scopes that have previously reported the location of the target may also receive the latest location data of the target to assist in tracking the target. The scopes in this embodiment can be connected using any available WLAN technology but in the preferred embodiment, a mesh networking technology is used to enable the plurality of scopes to communicate with each other. It is understood that any one of the scopes can perform the functions of the network server or the functions of the network server can be distributed among the plurality of scopes for redundancy in case one of the scopes loses connectivity to the WLAN. Ideally, at least one of the scopes is connected to the Internet and the other scopes in the network are thus able to access the Internet through the connected scope by way of the mesh network.

Since the target may be a moving object, the location data of the target for the scopes that have identified the target is continuously streamed to the scopes that have not yet located the target. Alternatively, the location of the target is only sent when the lead scope activates a switch that designates the target. In a more advance version of the system, when the target is moving, the scope and/or the network server will predict the future location of the target assuming continued movement in the same direction using known techniques.

I. Definitions

The following definitions are provided to promote understanding of the present invention.

device—The device is the object that a scope is integrated into. Examples of such devices include a rifle, gun, binoculars, smart eyeglasses or goggles, helmet visor and a drone. Certain types of devices are themselves "scopes," such as binoculars, telescopes and spotting scopes. The device may be handheld or may be mounted on a land, aerial or water based vehicle.

target—The target is the object of interest. It may be a person, animal or object, and may either be stationary or moving.

lead scope—The lead scope is the first scope that identifies a target. In the first embodiment, there is only one lead scope. In the second embodiment, the lead scope is only the first scope that located the target. Subsequent scopes that identify the target are simply referred to herein as "scopes." In one preferred embodiment, any scope in the network can function as a lead scope.

follower scope—The follower scope is a scope that attempts to hone in on the same target that the lead scope identified. In the first embodiment, there may be one or more follower scopes. In the second embodiment, the follower scopes include all of the scopes that have not yet honed in on the target that the previous set of scopes (including the lead scope) has identified. In one preferred embodiment, any scope in the network can function as a follower scope.

II. Detailed Description

The description below presumes that each of the device's scopes have similar functionality and can function as either a lead or follower scope. However, in an alternative embodiment, certain scopes may be dedicated to a lead or follower role, and certain scopes may have more or less functionality than other scopes.

A device having a scope includes each of the following measurement devices (or their equivalents):

1. GPS/INS device (provides location data of the device) (could be implemented as two or more distinct devices such as a GPS receiver, gyroscope and accelerometer)

2. rangefinder (provides the distance from the device's scope to the target). In the preferred embodiments, laser technology is used by the rangefinder to detect range but other technologies such as optical distance measurement could also be used. One example of an optical distance measurement system uses a series of lenses and mirrors to produce a double image and a dial or other controller with distance indicia is adjusted to bring the two images into alignment.

3. compass (provides the direction of the target relative to the position of the scope (north, south, east, and west)). The compass may be a standalone device, or may be incorporated into the GPS/INS and determine direction using GPS compassing. GPS compasses often have two antennas and if the device is a pair of binoculars, one option would be to place an antenna on each barrel. Accuracy can be increased by increasing the separation of the antennas used by the GPS compass such as through the use of one or more fold-out arms, booms, lighter than air balloons or other mechanical means to obtain separation, or by connecting a second antenna through an RF or optical connection.

4. orientation sensor (provides attitude data, namely, the pointing angle of the device relative to a fixed level plane (e.g., zero degrees if pointing straight ahead, 30 degrees up if pointing at a bird or plane in the sky or −10 degrees if pointed down into a valley)

5. elevation sensor (optional) (provides absolute elevation above sea level or other reference point). This would typically be a barometric sensor that would supplement the accuracy of the elevation determined by the GPS/INS which, in some cases is not particularly accurate. Alternatively, an ultrasonic or other proximity sensor may be used to determine the distance to the ground if the GPS/INS either incorporates or has access to a topographic map though a network connected scope. For example, if the GPS position corresponded to a position on a topographic map that is 500 feet above sea level and the proximity sensor determines that the distance from the scope to the ground is 5 feet, an accurate elevation of 505 feet would be known by the scope.

Data from these measurement devices are used to calculate the position of the target, which may be expressed in GPS coordinates or the like.

As discussed in detail below, for each above identified measurement devices, there are varying degrees of accuracy and an anticipated error range. As the technology associated with the measurement devices improves, it will be possible to improve the operation of the scope and provide a more accurate prediction of the target location by using more accurate measurement devices.

A. Example Steps for First Embodiment

1. The operator of a device that contains the lead scope identifies a presumed target.

2. The operator of the device either centers a cross-hair or other target indicia to the center of the target or using a pointing device such as a touchpad or eye tracking sensor, causes a cross-hair to move to the center of the target.

3. The operator optionally presses a button to cause the target to be designated.

4. If not operating in a continuous manner based on the position of the cross-hairs, the rangefinder is activated and the data from the measurement devices is stored in memory.

5. The lead scope calculates a local AER (azimuth, elevation, range) position of the target based on the stored directional and range measurement data. A calculation is then made using the stored positional measurement data to convert the local AER position to a global position. In the preferred embodiment, the global position is designated as GPS coordinates. In some cases, an accuracy or estimated error associated with the target position is also determined by the lead scope. An alternative implementation which obtains the same result involves the wireless transmission of the stored measurement data, as opposed to the position data to the follower scope or other device connected to the network such as a network server. In this alternative embodiment, the follower scope or network server calculates the target position and, in some cases, the estimated error or accuracy, from the measurement data. Either the determined position data and error or accuracy data (if collected or determined) or the measurement data is transmitted to the follower scope. Through the above operations, either one or more follower scopes will wirelessly receive the position data or calculate it from the received measurement data transmitted by the lead scope.

6. If the system includes a network server and the network server receives the raw data from the measurement devices transmitted by the lead scope, it calculates the target position and stores the data. If the network server receives the calculated target position, it stores this data and forwards it to other scopes. It is understood that the system can be operated without a network server and that the features described as being performed by the network server could be performed by any scope or device in the network or by a remote network server to which the scopes are connected via the Internet. 7. A follower scope on another device wirelessly receives either from the lead scope or from the network server the target position calculated by the lead scope.

8. The device containing the follower scope also includes the same set of measurement devices (or their equivalents). The follower scope uses its own location data and the target position to calculate the bearing and attitude where the follower scope should aim so as to be pointing at the same target position as the lead scope. As an alternative, the follower scope could include a reduced set of measurement devices and operate with reduced functionality. For example, if the rangefinder was not included in the follower scope, it would have limited functionality as a lead scope.

9. Visual (guiding) indicators are displayed on the device of the follower scope to direct (guide) the operator of the follower scope as to where the scope should be moved to so as to lock in on the target position. For example, an eyepiece of the follower scope may include the visual indicators. Alternatively, a device or scope-mounted display may provide the visual indicators. The visual indicators may be directional arrows, LED lights, text messages (e.g., move left, move up), or the like. Audio indicators may be used as well.

10. If the lead scope moves its physical position or its aiming position and indicates that the target has been relocated, the calculations are automatically rerun and sent to the follower scope so that the follower scope can continue to search for the target. Likewise, if the follower scope moves from its initial position, the calculations at the follower scope of the vector to the target must be redone, even if no changes are made to the physical position or aiming position of the lead scope so as to update the guiding indicators display within the follower scope.

In an alternative embodiment, only the raw measurement data from the lead scope is passed along to the network server or other scope and each follower scope uses the raw measurement data from the lead scope to calculate the target position of the lead scope. That is, if the follower scope receives the raw measurement data, it must perform the target position calculation of the lead scope before it can determine the relative position of its own device to the target.

Additional options include the ability of the lead scope to capture a digital image of the target using a digital image sensor incorporated into or attached onto the scope and transmit the digital image to the follower scope so that the operator of the follower scope would know what it is looking for. A further option would be for the follower scope to signal back to the lead scope that it sees the target and to transmit a digital image of its view of the target. Capturing a digital image of the target could have unique applications in military and law enforcement. For example, if at least one of the scopes is connected to the Internet and the digital image is a human face, the digital image could be transmitted through the Internet to a database that would attempt to match the face using facial recognition. If a match is identified, additional information about the target could be provided to each of the scopes. As an alternative to conventional face recognition, other biometric measures can be captured and transmitted such as gait and facial blood vessel patterns which when used with a thermal imager can form a digital fingerprint of a human face.

In the above description, it is assumed that a conventional optical system is used to capture the image. However, alternatives such a night vision and forward looking infrared could also be used.

B. Example Steps for Second Embodiment

The steps of the second embodiment are similar to the first embodiment, except that a network server (which as noted above could be one or more of the scopes in the network) performs additional calculations as described above to amalgamate the estimated location data that is accumulated from each scope that identified the target to define successively more precise location data of the target (i.e., more data points increase the precision of the location), which is then communicated to the scopes that have not yet located the target. Additionally, the network server can store multiple targets (such as from multiple lead scopes) and communicate those to each follower scope in the network.

C. Examples of Uses for the Network-Connected Scopes

Connected rifle scopes: two hunters are hunting. One hunter spots a prey and signals to the other hunter to lock in their scope on the same prey. If the scopes are equipped with image capture and display devices, the image of the prey could be sent from the first hunter to the second hunter and the second hunter could signal the first hunter using the connected scope that it has seen the target and potentially transmit the image that it has seen back to the first hunter. If the first hunter has lost the target, the second hunter would then become the lead scope and transmit the position of the target (or raw measurement data) back to the first hunter who would attempt to reacquire the target.

Connected binoculars: two birdwatchers are birding. One birdwatcher spots a bird and signals to the other birdwatcher to lock in their binoculars on the bird.

Connected drones and rifle scopes: A drone operated by a law enforcement agency identifies the position of a suspected shooter in a field. Police armed with connected rifle scopes are directed to the suspected shooter position data as initially determined by the drone and as further refined by subsequent position data collected from police who subsequently identify the shooter in their connected rifle scopes.

D. System Architecture

FIG. 1A shows a system view wherein a plurality of devices 10 (device$_1$-device$_n$) and non-device/non-scope nodes 12 (node$_1$-node$_n$) are in communication with a network server 16 via wireless communication and an electronic network 18. The electronic network 18 is represented by the solid lines connecting the devices 10 to the network server 16. The electronic network 18 may be implemented via any suitable type of wireless electronic network (e.g., local area network, wide area network (the Internet)). The functions of the one or more non-device/non-scope nodes 12 ((node$_1$-node$_n$) are described below. In FIG. 1A, at least the network server 16 is connected to the Internet 20.

Figure 1B:
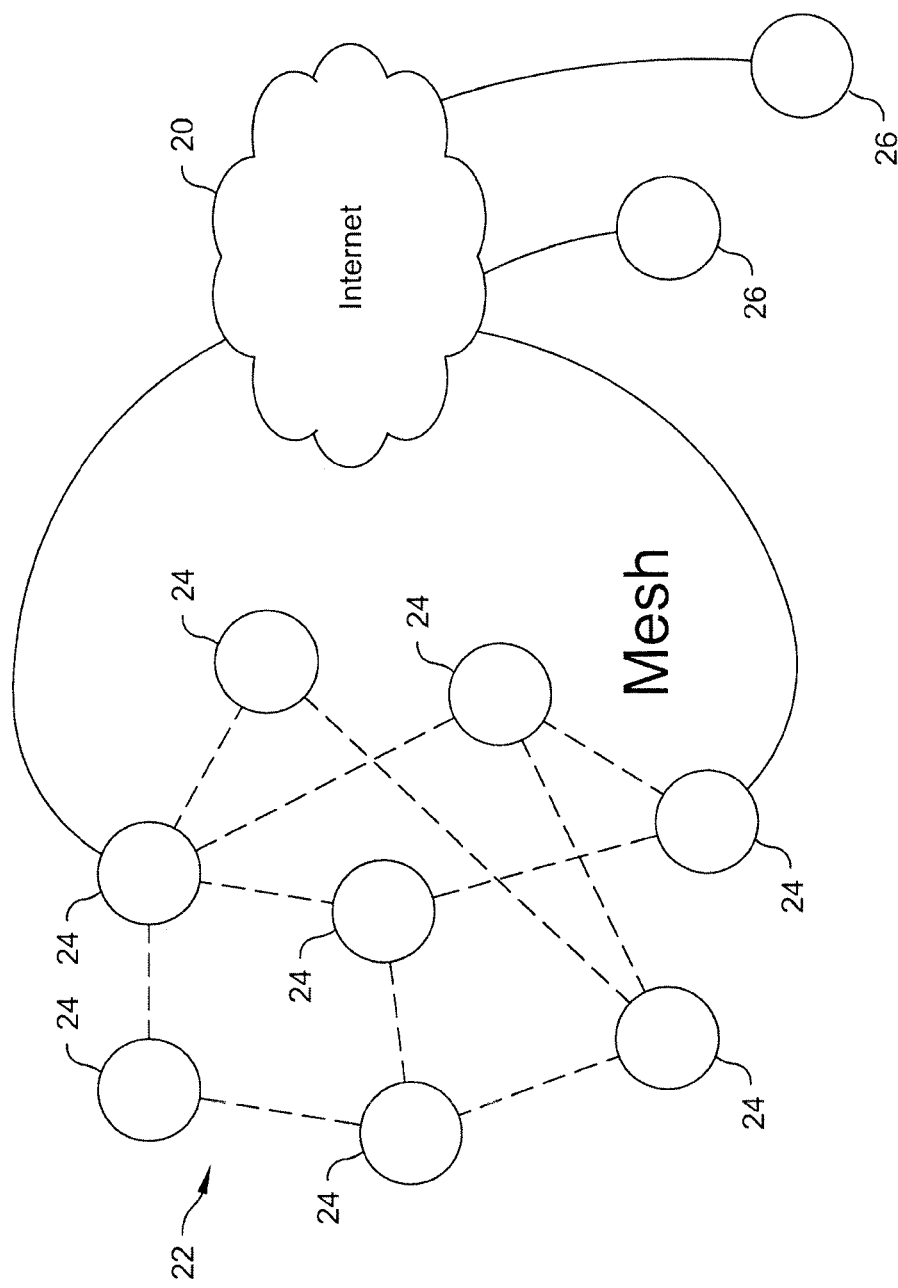

FIG. 1B shows the topology of a mesh network 22 that is suitable for use in preferred embodiments of the present invention. Preferably, the plurality of devices 10 and the network server 16 are nodes 24 in the mesh network 22, and thus these elements are labeled as nodes 24 in FIG. 1A. In this manner, each of the nodes 24 are capable of being in communication with each other via the mesh network 22. In this configuration, either the network server 16 becomes another node 24 in the mesh network 22, or there is no network server 16, or one or more of the device scopes perform functions herein described as being performed by the network server 16. In FIG. 1B, at least one of the nodes 24 is connected to the Internet 20. Additionally, there may be one or more nodes 26 that are outside of the mesh network 22, but which can communicate with nodes 24 in the mesh network 22 via the Internet 20.

The scope of the present invention includes other types of network topologies and is not limited to a hub and spoke network architecture with a server at the hub. The devices/nodes may be directly connected to each other wirelessly (e.g. by way of a point to point connection which could also be an ad-hoc network). Each device/node may have a cellular or satellite connection and connect with each other through the cloud (i.e., the Internet). Each device/node may connect with each other through a wireless router that may be land-based or aerial such as in a tethered hot air balloon or drone programmed to stay in a fixed aerial location.

Furthermore, in the second embodiment, devices/nodes may connect to the network in different fashions. For example, in a six node network, five of the nodes could be in range of the mesh network 22. However, the sixth node could be out of range and connected to the network by a cellular or network signal via the Internet 20.

Figure 2:
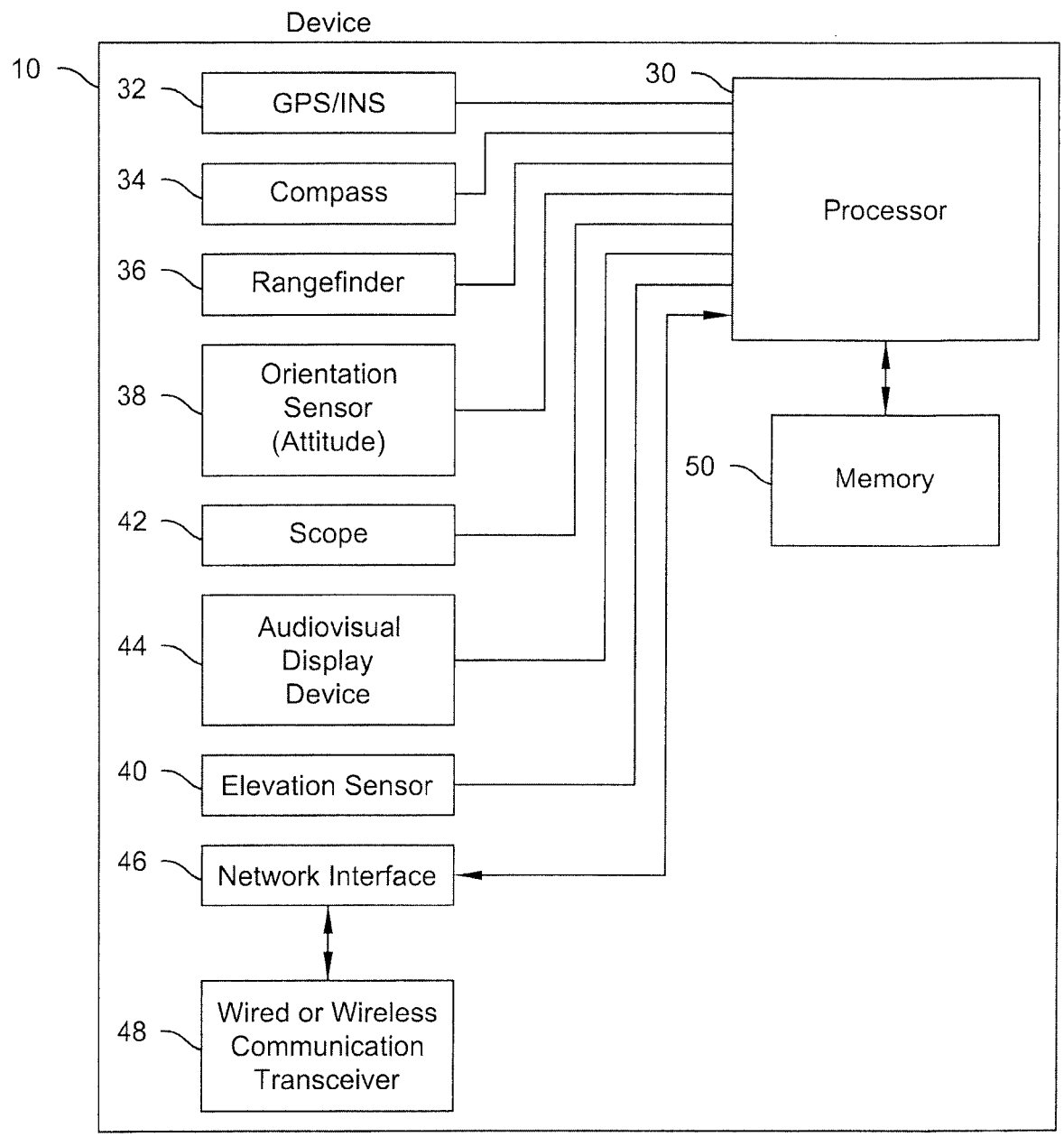

FIG. 2 shows elements of a sample device 10, which may include (or may be) either a lead scope or a follower scope. The device 10 includes a processor 30 connected to at least the following elements:

1. GPS/INS 32
2. compass 34 (which can be either standalone or integrated into the GPS/INS)
3. rangefinder 36
4. orientation sensor 38 (attitude)
5. elevation sensor 40 for improved accuracy (optional)
6. scope 42 (the structure of the scope will depend upon the type of device)
7. audiovisual display device 44 (which can be either standalone or integrated into the scope)
8. network interface 46 in communication with a wired or wireless communication transceiver 48
9. memory 50

The audiovisual display device 44 is the element that provides prompts/messages and indicators to the user. In follower scopes, information provided by the audiovisual display device 44 assists the user in honing in on the target. Depending upon the type of device 10 and the environment that the device 10 is used in, there may be only video, only audio, or both audio and video provided by the audiovisual display device 44.

Figure 3:
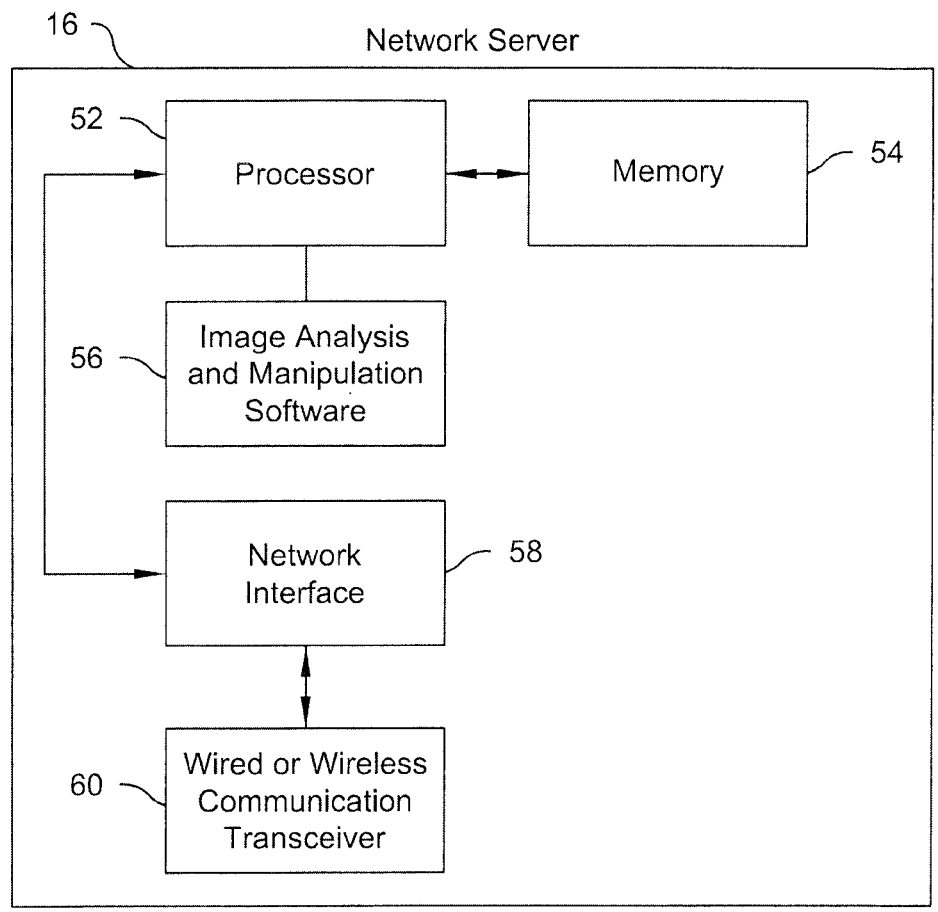

FIG. 3 shows elements of the network server 16, including a processor 52, memory 54, image analysis and manipulation software (IAMS) 56 which can implemented using artificial intelligence software, and a network interface 58 in communication with a wired or wireless communication transceiver 60.

The processor functions of the individual devices 10 and the network server 16 depend upon the system architecture and the distribution of computing functions. As described herein, some of these functions can be performed at either processor 30 or 52, whereas other functions may be performed by the network server's processor 52.

Figure 4A:
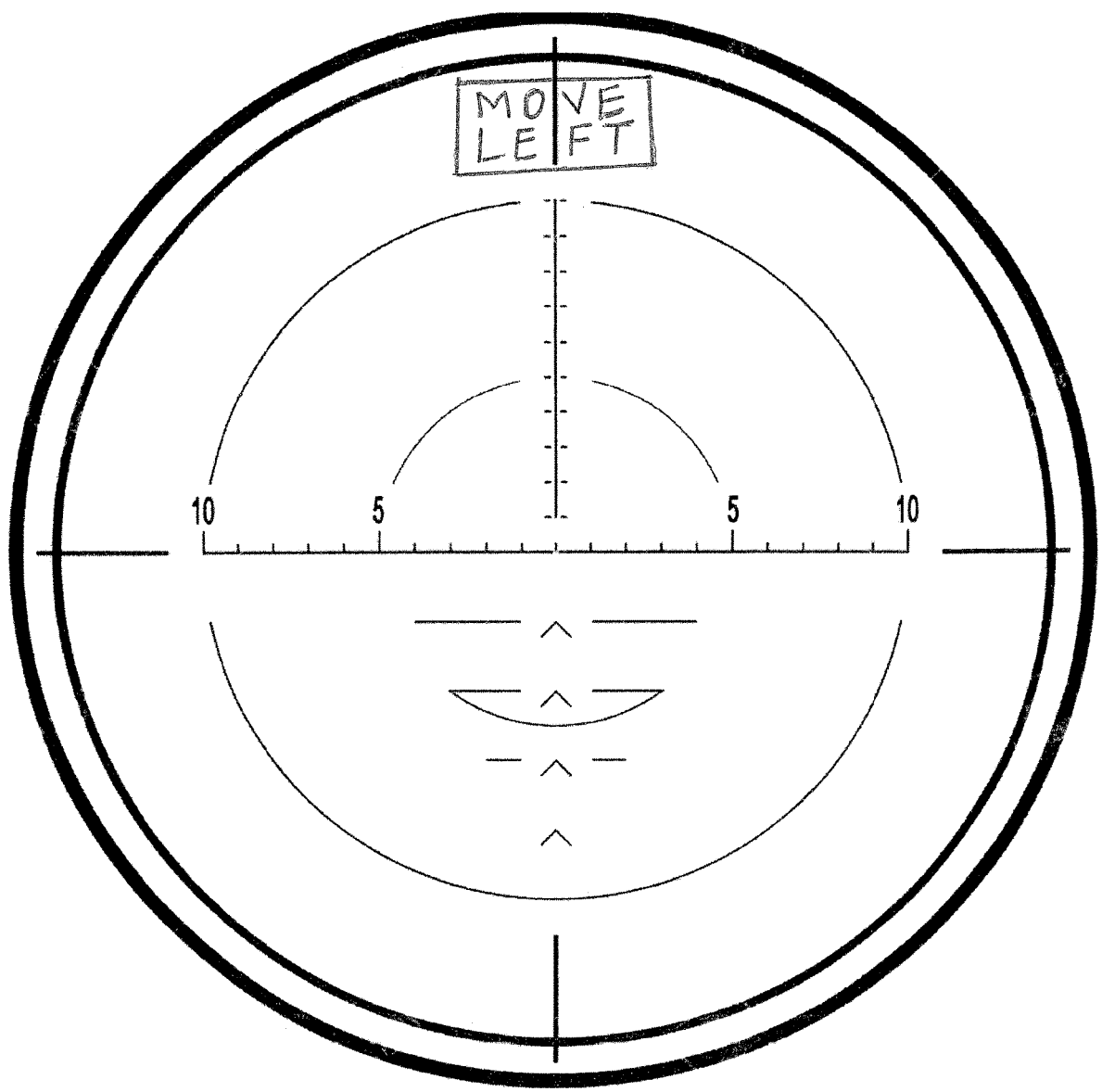
FIGS. 4A-4C are optical sights in accordance with preferred embodiments of the present invention.
Figure 4B:
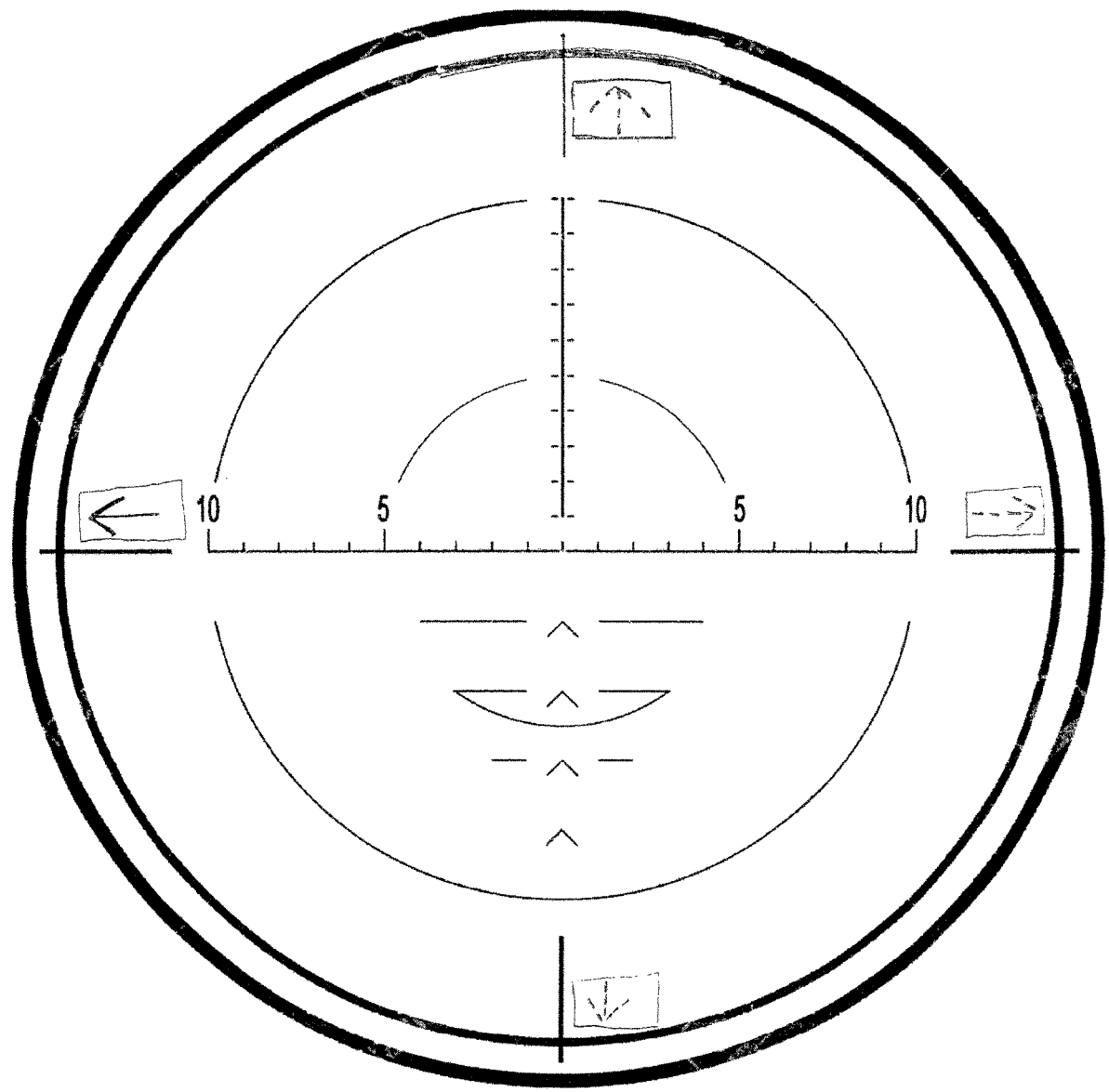
Figure 4C:
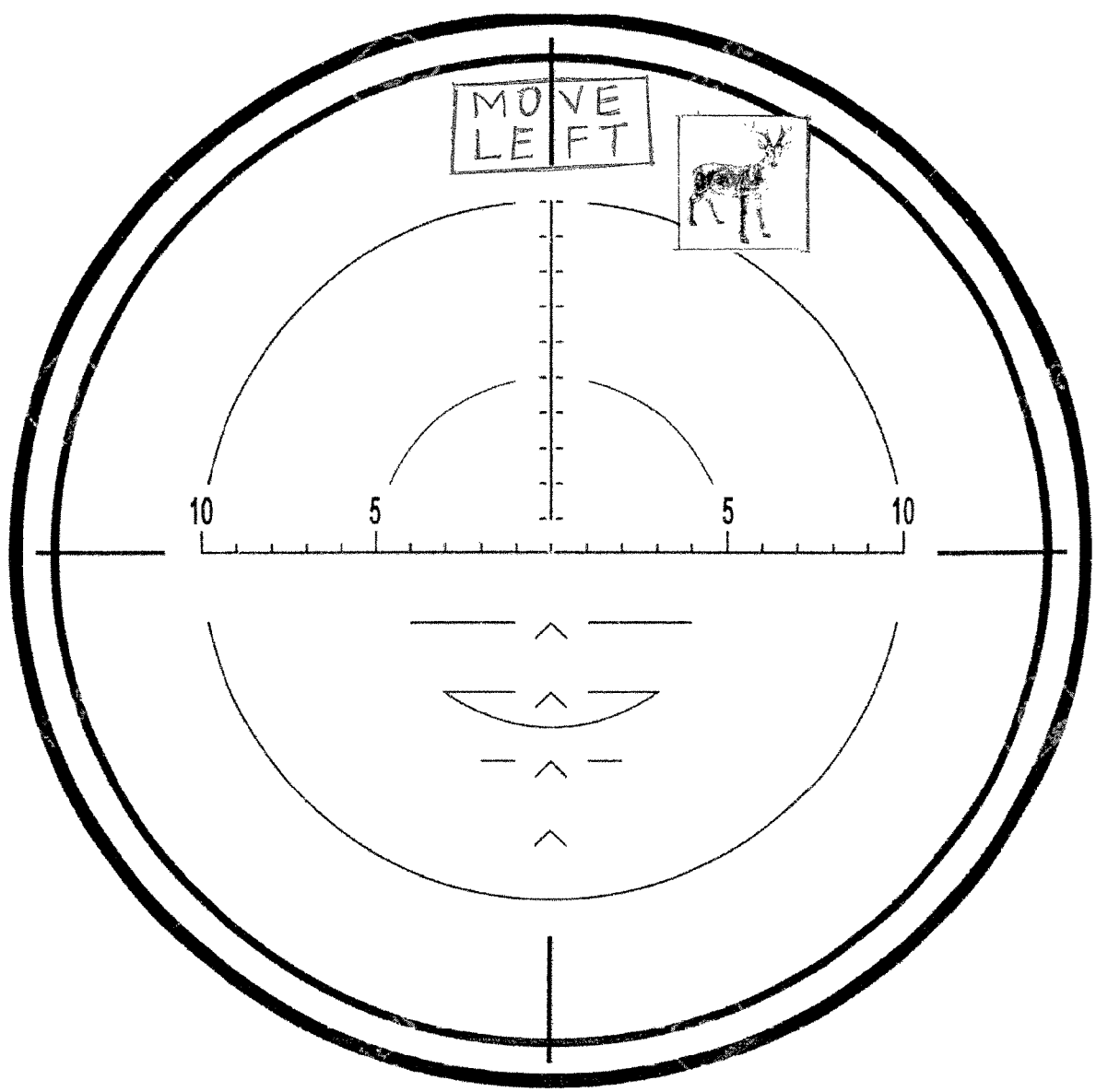

FIGS. 4A-4C each show an optical sight (scope) for a rifle having an integrated audiovisual display device. In FIG. 4A, the display device is located at the zero degree position and presently reads "MOVE LEFT." In FIG. 4B, the display device has four separate areas, at zero, 90, 180 and 270 degrees. The display device in FIG. 4B is currently indicating to move left (left arrow at 270 degrees is on indicated by a solid line, whereas the other three arrows for up, right and down, are off, as indicated by dashed lines). FIG. 4C is similar to FIG. 4A, except that it includes an additional display element that shows the image that the user should be trying to locate. The direction prompts in these figures indicates that this rifle is presently functioning as a following scope.

III. Additional Considerations

A. Target Position Weighting

When calculating a presumed target position from GPS data and the other measurement devices, there are known, quantifiable errors introduced by the lead scope and follower scope(s), which can be represented by discrete values (e.g., +/−20 cm). Certain types of errors will be consistent from scope to scope based on inherent limitations of the measurement devices. Other types of errors may depend upon signal strength, such as the strength of a GPS signal or number of satellites used to calculate the position of the lead scope. For each calculated target position, the lead scope, follower scope and/or network server identifies the error value. When amalgamating and accumulating target positions from multiple scopes to calculate an updated target position, the error values may be used to weight the strength given to each target position.

Various algorithms may be used to process the target positions. For example, target positions with the lowest error values may be more highly weighted. Alternatively, a target position with a very high error values compared to other target position error values may be deleted from the calculation. One way to use the additional data to more accurately predict the position of the target would be to place points representing each estimated target position on a 3-dimensional grid and estimate the center point or average location of the data representing the estimated targets. The center point can be adjusted based on weighting as discussed above.

In addition to using error values for target position weighting, a temporal factor may be used. For example, the most recently observed target positions may be given greater weighting. Certain target positions may be eliminated entirely from the weighting after a predetermined period of time has passed from the observation time.

The temporal factor may also be affected by the nature of the target for embodiments where the type of target is determined (e.g., car, person, deer) by the IAMS and/or by the scope. The temporal factor is likely to be more important for fast-moving targets compared to slow-moving targets. Thus, for a fast moving target (e.g., a car), the most recently observed target positions may be given significantly greater weighting, and older target positions would likely be eliminated more quickly from the weighting compared to slower moving targets.

Since a normally fast moving target might not actually be moving (e.g., a stationary car), and a normally slow moving target may actually be moving fast (e.g., a running person or deer), the IAMS may also use various algorithms to determine if the target is actually moving, and if so, at what speed. This calculation may then be used for the temporal factor. For example, if a target appears to be stationary, then no temporal factor will be applied to the weightings. The algorithm may look at multiple observed target positions and if they are relatively similar after factoring in their respective error values, and were observed at significantly different time intervals (i.e., not very close in time), it can be concluded that the target is stationary. Conversely, if multiple observed target positions are significantly different after factoring in their respective error values, and were observed very close in time, it can be concluded that the target is moving, and the temporal factor should be used in the weighting.

B. Error Indicator

In one preferred embodiment, the visual indicator visually communicates the error information in a form that is useful to the device operator. For example, if the presumed target position is represented by a dot on a display screen of the device, an error box may by overlaid around the dot so that the operator of the device knows that the target may be in any of the areas within the error box, and is not necessarily exactly where the dot is showing. In the second embodiment, the error box presumably becomes smaller as more target positions are identified by a succession of follower scopes.

The exact manner in which the error information is communicated depends upon how the presumed target position is displayed on a follower device.

Advances in measurement sensors, particularly GPS technology, will improve accuracy and reduce errors. At some point, the errors may be sufficiently small that an error indicator would not enhance the user experience.

C. Image Display and Simulation

In one embodiment, the target is represented by a one-dimensional object on a display screen, such as a dot. In an alternative embodiment, the target is represented by a simulated two-dimensional or three-dimensional image on the display screen. If a digital image is captured and transmitted, the actual image of the target may be displayed on the screen. Using image analysis and manipulation software (IAMS) which could be implemented using artificial intelligence (AI) techniques such as a neural network, the simulation process allows for the target to be rotated so that it appears properly positioned with respect to the follower scope. Consider the following example:

1. A lead scope identifies a deer (target) that is a quarter-mile away and is facing the device head-on.
2. The target position of the deer and a physical image of the deer is captured by the scope and communicated to the network server.
3. The IAMS in the network server or remotely accessed via the Internet identifies key visual features within the image and compares these features with known objects to categorize the target as a front view of the deer and retrieves a simulated image of a deer from its database.
4. A follower scope receives target position data regarding the deer, and it is determined that the follower scope is also about a quarter-mile from the deer but is 90 degrees off compared to the lead scope. The IAMS can then rotate the simulated deer by 90 degrees and communicate a side view of the deer for display on the follower scope so that the follower scope knows what the deer is likely to look like.
5. After physical image data is captured from a plurality of scopes, the IAMS can build a 3-D image of the target, thereby enabling a more realistic view of the target to be displayed on the follower scopes that are still looking for the target. The IAMS must know the positions of both the lead scope and the follower scope to perform the rendering since both positions are necessary to know how to rotate the 3-D image of the target. If actual images are captured, one option would be for the IAMS to combine the actual image data rather than simulate the image.
6. In law enforcement applications, the IAMS could attempt to match the target image to a person using facial recognition or other biometric techniques. If there is a match, information about the target could be returned to the scopes.
7. A further application of an image display system incorporated into the scopes would be the ability of the follower scope to retrieve a high-resolution aerial image or topographical map and display the aerial image or map on the display of the follower scope together with some indicia of the approximate location of the target. If error information is known, a box can be displayed on the aerial image or topographical map showing the area in which the target may be located. By combining the features of directing the scope to the target, providing an image of the target as seen by the lead scope and providing an aerial view or topographical map including the approximate position of the target together with an error box, the process of finding a target is greatly accelerated.

In a third embodiment, the target is represented by a bounding box or highlighted image segment on the display when present in the scope's field-of-view. If a digital image of the target is captured, the IAMS may be used to identify key visual features within the image that allows recognition of the target object in future collected images. When the field-of-view of the follower scope nears the target, the digital image buffer of the follower scope field-of-view is processed by the IAMS to determine if there is a pattern match between the key visual features of the target identified previously and features within the current field-of-view. Upon finding the target image features, the target is visually indicated. If the follower scope has an optical display, one embodiment includes a transparent display overlay that is activated to highlight a target in a particular color or draw a box around the target. If the follower scope has a visual display, the matched target is designated as described above. Consider the following example:

1. A lead scope identifies a deer (target) that is a quarter-mile away and is facing the device head-on.
2. The target position of the deer and a physical image of the deer is captured by the scope and communicated to the network server.
3. The IAMS in the network server or remotely accessed via the Internet uses computer vision techniques to segment the image, separating the target from the background image.
4. The IAMS generates a set of key identifiable features within the image segment, such as the points on the deer's antlers and a white patch on its side.
5. A follower scope receives target position data regarding the deer and it is determined that the follower scope is also about a quarter-mile from the deer, but is 45 degrees off compared to the lead scope. The IAMS can then rotate the visual feature-set corresponding to the target by 45 degrees so that it knows what the features should appear as in the follower scope's field-of-view.
6. The follower scope aims in the general direction of the target, guided by the instructions regarding the target's location. Images of the current field-of-view of the follower scope are sent to the IAMS as the follower scope moves for processing.
7. The IAMS performs pattern matching on the incoming follower scope images, comparing key features within the image with the target feature-set generated from the target scope and adjusted for the follower scope's viewing angle. If a pattern match occurs, the location of the target, within the follower scope field-of-view, is transmitted to the follower scope.
8. The follower scope presents a bounding-box overlay highlighting the location of the target within the display.
9. After physical image data is captured from a plurality of scopes, the IAMS can build a larger set of key identifying features from multiple angles.

D. Target Position Calculations

Calculation of a target position from the measurement data may be performed by any one of known techniques which rely upon GPS data. U.S. Pat. No. 5,568,152 (Janky et al.), which is incorporated herein by reference, discloses a methodology for determining the location of a target by an observer who is spaced apart from the target and who is viewing the target through a viewer/rangefinder. U.S. Pat. No. 4,949,089 (Ruszkowski, Jr.), which is also incorporated herein by reference, discloses a similar methodology. Any such methodologies may be used to calculate the target position.

To calculate the position of a follower scope relative to the target, one must effectively perform the reverse of the calculations of the lead scope. The follower scope knows its GPS coordinates and it has received the approximate GPS coordinates of the target from the lead scope or network server (or calculated the target position based on directly or indirectly wirelessly receiving the raw measurement data from the lead scope. With this information, the follower scope (or the network server or another node in the network) calculates a route between the two GPS coordinates. Unlike a vehicle route where you are effectively only determining a two-dimensional direction from point A to Point B, the follower scope also determines a precise vector and range from its position to the position of the target. Since the follower scope also has a GPS/INS device, it uses the information concerning the calculated vector to the target to direct the user to point the follower scope in alignment with the vector to the target.

Consider the following example: Assume that the follower scope determines that the device user is presently looking due west (270 degrees) in the horizontal plane and the vector to the target is due north (0 degrees). The follower scope would display a right arrow or otherwise indicate that a clockwise rotation is required and would stop the user (via displayed or verbal cues) at the point when the user is pointed at 0 degrees. At that point, the follower scope would determine the vector in the vertical plane. For example, if the follower scope is level but the vector to the target is 10 degrees lower, the follower scope would direct the user to lower the angle of the follower scope until it matches the vector to the target in the vertical plane. The above example assumes that the user would be directed to the target first in the horizontal plane and then in the vertical plane. However, it is possible to simultaneously direct the follower scope in both the horizontal and vertical plan by simultaneously displaying both a right arrow and down arrow. And, because of the GPS/INS device, the follower scope always knows its orientation and direction using GPS compassing.

E. Infrared Sensor/Heat Signature

In addition to a normal optical mode embodiments described above, an alternative embodiment of the scopes incorporate a forward-looking infrared sensor to detect heat signatures of targets. Using the rangefinder, the system detects the location of the target corresponding to the selected heat signature and then in addition to or instead of transmitting an image of the target of interest, the system transmits the heat signature.

F. Non-Visual Displays

Although the preferred embodiment transmits the image and/or heat signature to the other devices in the system, at least a portion of the devices may not have visual displays. In that case, the follower scope may rely simply on directional arrows or other indicia to direct the user of the follower scope to the target.

G. Audio Prompts

In lieu of directional arrows or other indicia to direct the follower scope, a connection between the follower scope and a pair of headphones, connected wired or wirelessly such as by Bluetooth, may be used which directs the use to move the device (e.g., up, down, left, right).

H. Direct Use of Range Information

In the embodiments described above, range information from the rangefinder is not used for identifying the target at the follower scope. Since optical scopes and binoculars focus for variable distances, the guidance to target information may also include indicia to allow the user to know the correct distance to look at or focus on. In the audio embodiment, commands may be provided to focus nearer or further, look closer, or the like. Stated another way, the user is already looking along a vector calculated based on the known target location and the known location of the follower scope. The rangefinder can be used to get an idea of whether you are too far or too close to the target. For example, the target may be one mile away, but the user is currently looking 1.5 miles away.

I. Target Marking

The lead scope may incorporate cross-hairs or other target selection indicia such as a reticle to mark the target. Once marked, the rangefinder detects the distance to the target and the system determines the coordinates of the target and notifies the follower scopes of the target position as described above or communicates with an available network server to store the coordinates of the target.

J. Trigger Switch

In a rifle or gun application, the lead scope may incorporate the switch to send the information to follower scopes into a sensor on or adjacent to the trigger.

K. Overlay for Display

A more complex follower scope may include a higher resolution display and utilize augmented reality techniques to overlay visual information received from the lead scope and indicia directing the follower scope to the target onto an optical field-of-view of the follower scope. An overlay may be implemented by a heads-up display or equivalent or by switching to a complete digital display.

L. Target Image Capture

The image of the target may be captured in a manner substantially identical to a variety of techniques used in digital cameras. For example, at the point in time when the user of the lead scope designates the target, a mirror may fold down and direct the image to an image sensor similar to the operation of a digital SLR. The lead scope may also operate similar to a mirrorless or compact camera which does not use a mirror.

M. Adjustments for Hand Movements

Position movement of the lead scope due to hand movements of the device (e.g., rifle/gun, binoculars) by the user may introduce instability to the system. To address this issue, a touchpad or other pointing device may be mounted on the device and used to move the cross-hairs or other target indicia over the target. Once the target is tagged, the range is determined based on the range to the center of the cross-hairs using the rangefinder. In some cases, and depending on the range finding technology used, it may be necessary to mechanically redirect the rangefinder to point at the target using linear or other silent motors which would make minimal noise. Once the range is determined, the target position calculation is performed and adjusted for the offset between the orientation of the lead scope and the offset to the orientation determined based on the amount that the cross-hairs have been moved off-center.

N. Terrain Obstructions

In some cases, terrain features (e.g. hills, mountains) may be on the path of the vector between the follower scope and the target. For example, if the lead scope is one mile due north of the target and the follower scope is two miles due south, there could be a hill between the follower scope and the target. Detailed topographic maps and navigational tools are readily available. For example, software products such as Terrain Navigator Pro, commercially available from Trimble® subsidiary MyTopo™, Billings, Mont., provides detailed topographical maps of the entire U.S. and Canada and incorporates U.S. Geological survey maps at various scales. Using conventional GPS routing techniques known to those skilled in the art, either a computer in the lead scope or a computer in an intelligent node in the network of connected scopes can overlay the vector between the follower scope and the target onto a topographical map of the area and determine if the vector passes through a terrain feature that would make it impossible for the follower scope to see the target. If an obstruction is present, an indicia that the target is blocked from view may be presented to the user of the follower scope. In some embodiments, using the data from the topographical maps and the location of the target and follower scope, the follower scope may direct the user to move to another position, preferably the closest position, where it would have an unobstructed view of the target.

The computer in the lead scope or the computer in an intelligent node in the network of connected scopes outputs at least one of these information items (i.e., an indicia for display by the second scope that the presumed target is blocked from view, and electronically generated indicators for use by the second scope to prompt the operator of the second scope to move to another position that allows for an unobstructed view of the presumed target) when a determination is made that the vector passes through a terrain feature that would prevent the second scope from viewing the presumed target.

O. Multiple Scopes Acting as Lead Scope

In the second embodiment, there may be situations where multiple scopes send targets at the same time. In the second embodiment, each scope has the capability to be a lead scope or follower scope at any given time, thus creating the possibility that multiple scopes may be sending position information associated with different targets simultaneously. In embodiments where scopes can receive an image of the target transmitted by the lead scope, multiple target images could be displayed in a list and using selector buttons, a pointing device, or by tracking the eye and determining a focus point, the target of interest could be selected by the follower scope and thereafter the follower scope would be directed to the target as previously described. If the follower scope did not have the capability to display the target images received from multiple lead scopes, the user of the follower scope would be presented with a list of available targets and associated annotating information, such as distance to target, time of creation, or originating scope, and have the ability to select a target of interest through the use of selector buttons, a pointing device, or eye tracking. If the follower scope did not have the capability to present the user the list of targets, the processor would select the target based on predetermined criteria or an algorithm which would use various factors to select the best target. These factors could include nearest target, target with least error rate, target matched by the IAMS to a preferred target type such as a particular animal or person identified by facial recognition.

In embodiments where scopes can present digital overlays, the follower scope could support the simultaneous tracking of multiple targets of interest. Instead of selecting a single target of interest from a list of available targets, the user of a follower scope would have the ability to toggle each available target as shown or hidden. If an available target is set to show, indicia would be added to the follower scope overlay, annotated with a label indicating which target of interest it is guiding towards.

In some embodiments, it may be unclear if a scope is sending confirmation that it has identified and pointed at a target previously selected by a lead scope or acting as a lead scope and sending a new target. To eliminate this issue, a user interface may be included to allow the user of the scope to indicate whether it is sending position information associated with a new target or confirmation that it has seen a target that was previously designated by a different target. Alternatively, if images are transmitted with the position data and the system includes an IAMS, the IAMS could compare the images of the targets and determine whether to treat the received position data as associated with a previously designated target or a new target.

It is also possible that the user of a scope could make a mistake and improperly indicate that it has selected a target previously designated by a lead scope when in fact the scope is actually designating a different target. This could occur for a variety of reasons with one example being the same type of animal being within the error box. Ideally, when the target is designated by a scope when another target has previously been designated by a lead scope, the IAMS would have the capability of comparing the two images and determining that the target images have a low probability of being the same target and the that scope is acting as a lead scope and sending data associated with a new target.

P. Game Mode

The network-connected scopes may be used to play a game with scoring maintained by any one of the scopes or a network server. The game may operate over a fixed time interval. In one embodiment, the lead scope sets the target and each follower scope searches for the target. Points are awarded based on the order in which the follower scopes identify the target and/or the amount of time it takes for the follower scope to find the target. A maximum amount of time is provided for the follower scopes to find the target at which point the round ends. Either sequentially or randomly, a new lead scope is then designated to find a target and the next round is played. The winner of the game is the scope with the maximum points at the conclusion of the preset time for the game. Alternatively, the game ends when a target score is achieved and the players are ranked based on their points.

Q. Automatic Target Detection

The IAMS can be used to support the operator of a lead scope by identifying potential targets within the current field-of-view through object classification. Prior art processes exist to analyze image frames and identify objects in the image frame. For example, the GOOGLE® Cloud Vision API provides image analytics capabilities that allows applications to see and understand the content within the images. The service enables customers to detect a broad set of entities within an image from everyday objects (e.g., "sailboat", "lion", "Eiffel Tower") to faces and product logos. Software applications of this type may be used for identifying potential targets within the current field-of-view through object classification.

Using an IAMS-enabled lead scope having object classification functionality, the operator can select the type of target they are looking for from a preset list (e.g. car, person, deer), at which point an image is captured from the lead scope and the IAMS highlights any objects within the view that match the specified object type, such as with a bounding box or highlighted image segment. The lead scope can then be pointed at one of the highlighted potential targets and activated to designate the target.

In an alternative embodiment, the image processing can be continuous, such that as the lead scope is moved around, any objects that are found to match the specified object type are highlighted.

In another embodiment, the automatic target detection is extended to one or more follower scopes using features described in the image simulation and display of section C above. Consider the following example:

1. Automatic target detection is performed using the lead scope as described above.

2. Using the process described in section C above, the IAMS calculates how the target image should appear based on the location of a specific follower scope with respect to the lead scope. The appearance factors in the angle (e.g., same angle (head on), rotated +/−90 degrees (left or right side view), rotated 180 degrees (butt view)) and distance (e.g., same, bigger, or smaller in size, depending upon distance to the target).

3. An image is captured from the field-of-view of the follower scope and automated pattern identification is performed to determine if the expected target image from the lead scope, as it was calculated to appear by the follower scope, is actually in the field-of-view of the follower scope. For example, if a deer is supposed to appear rotated +90 degrees, a deer that is facing the follower scope head on, as determined from the automated pattern recognition, would not likely be the correct target. However, if the deer is supposed to appear rotated +90 degrees, and a deer is determined to be in the field-of-view of the follower scope and is also determined to be rotated +90 degrees, as determined from the automated pattern recognition, the deer is likely to be the correct target.

4. If the expected target image is in the field-of-view of the follower scope, a similar type of bounding box or highlighted image segment appears in the follower scope, and appropriate prompts are provided to the operator of the follower scope to re-position the follower scope from its current target position towards the target image in the bounding box or highlighted image segment.

Figure 5:
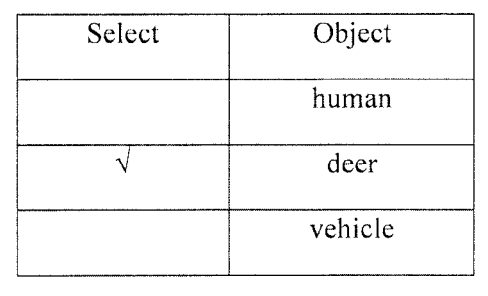

FIG. 5 shows a sample preset list that may be displayed on a display of scope. In this example, the listed objects include a human, a deer and a vehicle. The operator of the scope has selected "deer." Assume that the field-of-view of the scope is analyzed for object detection and the only object appearing in the field-of-view is a single deer at approximately the 1:00 o'clock position. This would result in a field-of-view similar to that shown in FIG. 4C with corresponding instructions to prompt the operator of the scope to move the scope from its current target position to the target position of the deer.

R. Focal Length of Scopes

In the embodiments described above, it is presumed that the scopes all have similar focal lengths. However, if the scopes have different focal lengths, the IAMS must make an appropriate adjustment when determining the size of the object being analyzed in the field-of-view and the size of the object displayed as an image in a follower scope. Preferably, the IAMS receives data regarding the focal lengths of the respective scopes so that any such adjustments can be made.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

S. Flowcharts

Figure 6:
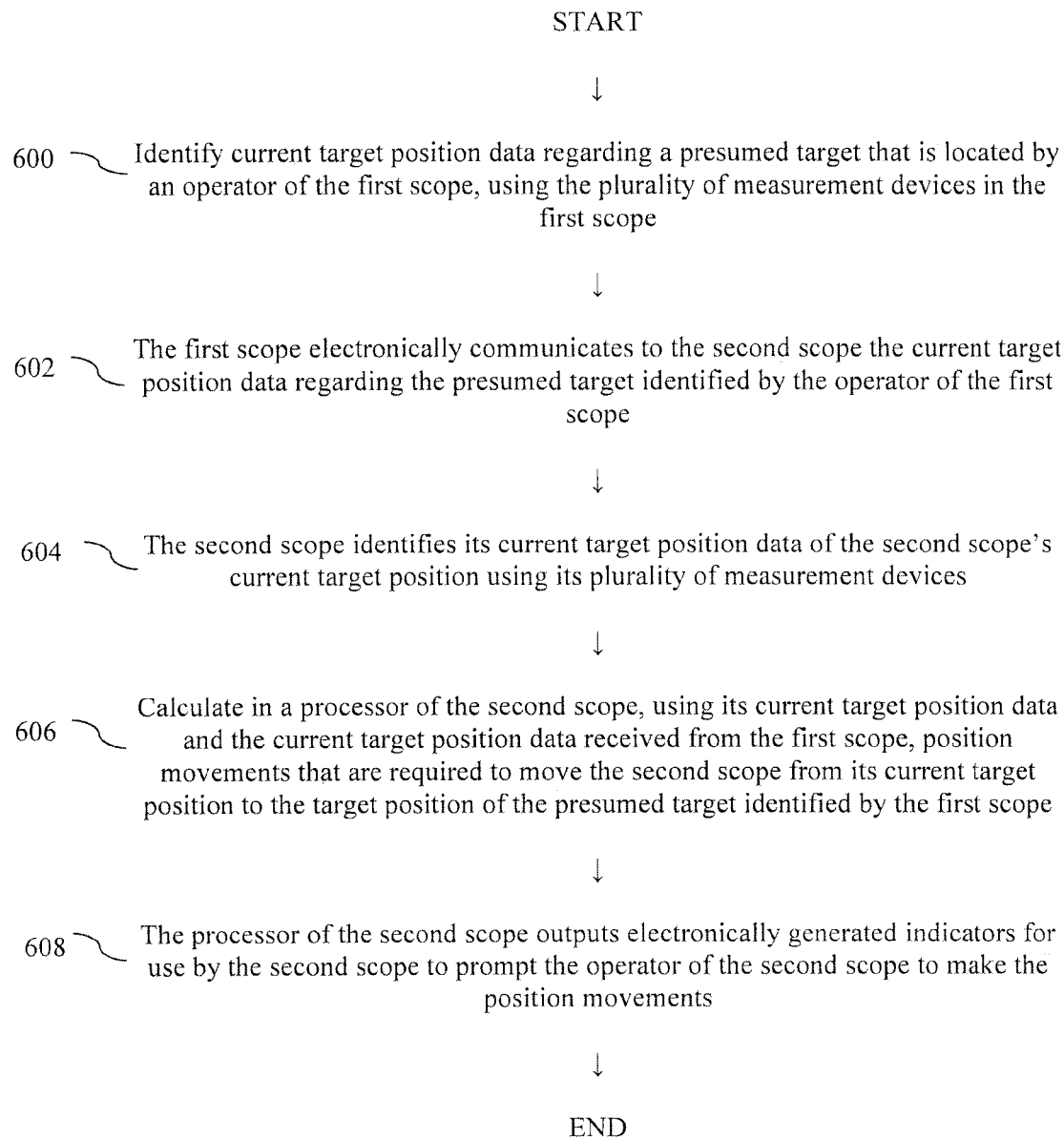
FIGS. 6-8 show flowcharts in accordance with preferred embodiments of the present invention.

FIG. 6 is a flowchart of a process for tracking a single presumed target by a first scope and a second scope located remotely from one another and being moved by separate scope operators, wherein each of the scopes include a plurality of measurement devices configured to provide current target position data. In one preferred embodiment the process is implemented by at least the following steps:

600: Identify current target position data regarding a presumed target that is located by an operator of the first scope, using the plurality of measurement devices in the first scope.

602: The first scope electronically communicates to the second scope the current target position data regarding the presumed target identified by the operator of the first scope.

604: The second scope identifies its current target position data of the second scope's current target position using its plurality of measurement devices.

606: Calculate in a processor of the second scope, using its current target position data and the current target position data received from the first scope, position movements that are required to move the second scope from its current target position to the target position of the presumed target identified by the first scope.

608: The processor of the second scope outputs electronically generated indicators for use by the second scope to prompt the operator of the second scope to make the position movements. The operator of the second scope uses the indicators to re-position the scope from its current target position so as to move towards the target position defined by the current target position data received from the first scope.

Figure 7:
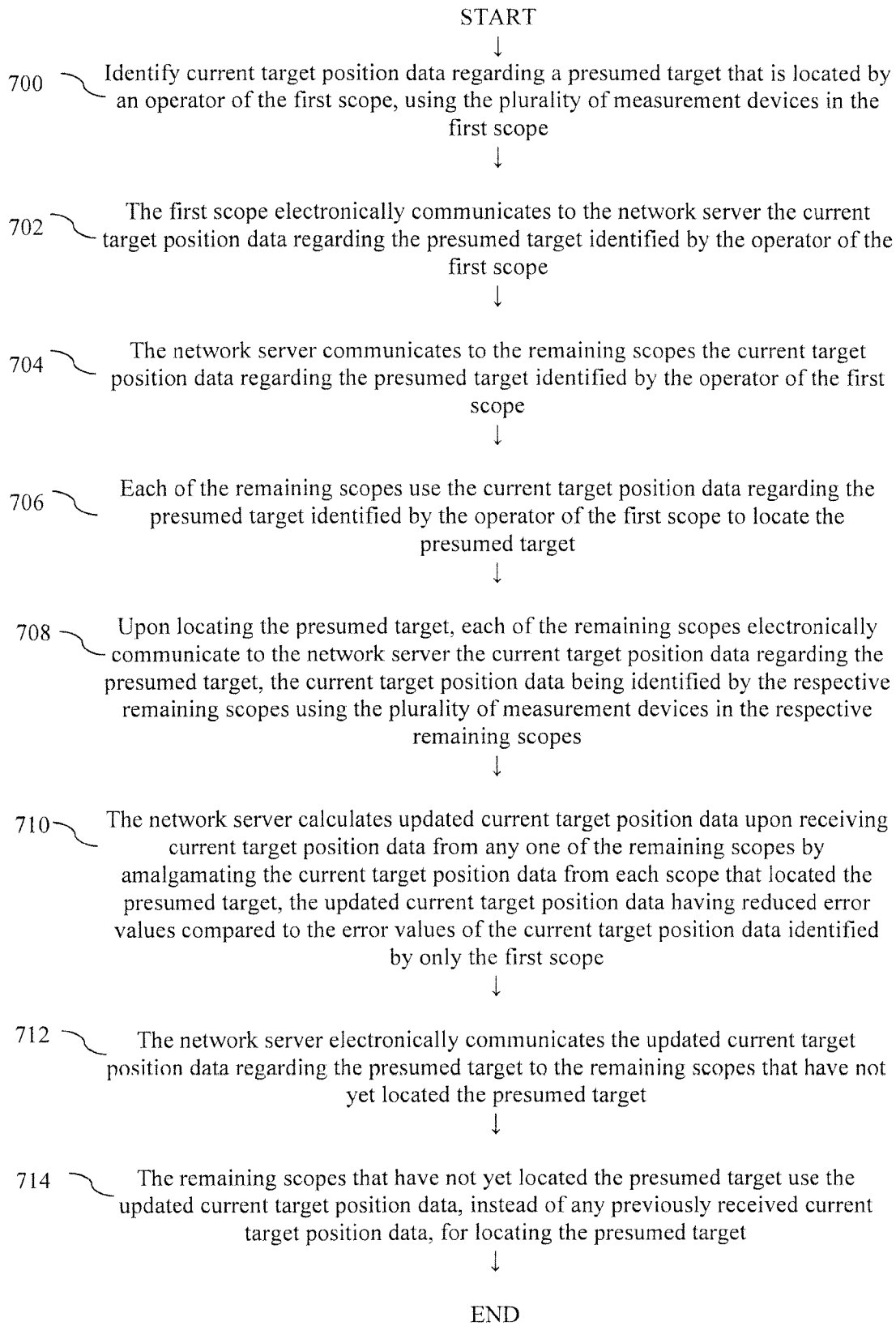

FIG. 7 is a flowchart of a process for tracking a single presumed target by a plurality of scopes located remotely from one another and being moved by separate scope operators, wherein each of the scopes include a plurality of measurement devices configured to provide current target position data, and each of the scopes are in electronic communication with a network server, and the current target position data have error values. In one preferred embodiment the process is implemented by at least the following steps:

700: Identify current target position data regarding a presumed target that is located by an operator of the first scope, using the plurality of measurement devices in the first scope.

702: The first scope electronically communicates to the network server the current target position data regarding the presumed target identified by the operator of the first scope.
704. The network server communicates to the remaining scopes the current target position data regarding the presumed target identified by the operator of the first scope.
706: Each of the remaining scopes use the current target position data regarding the presumed target identified by the operator of the first scope to locate the presumed target.
708: Upon locating the presumed target, each of the remaining scopes electronically communicate to the network server the current target position data regarding the presumed target, the current target position data being identified by the respective remaining scopes using the plurality of measurement devices in the respective remaining scopes.
710: The network server calculates updated current target position data upon receiving current target position data from any one of the remaining scopes by amalgamating the current target position data from each scope that located the presumed target, the updated current target position data having reduced error values compared to the error values of the current target position data identified by only the first scope.
712: The network server electronically communicates the updated current target position data regarding the presumed target to the remaining scopes that have not yet located the presumed target.
714: The remaining scopes that have not yet located the presumed target use the updated current target position data, instead of any previously received current target position data, for locating the presumed target.

Figure 8:
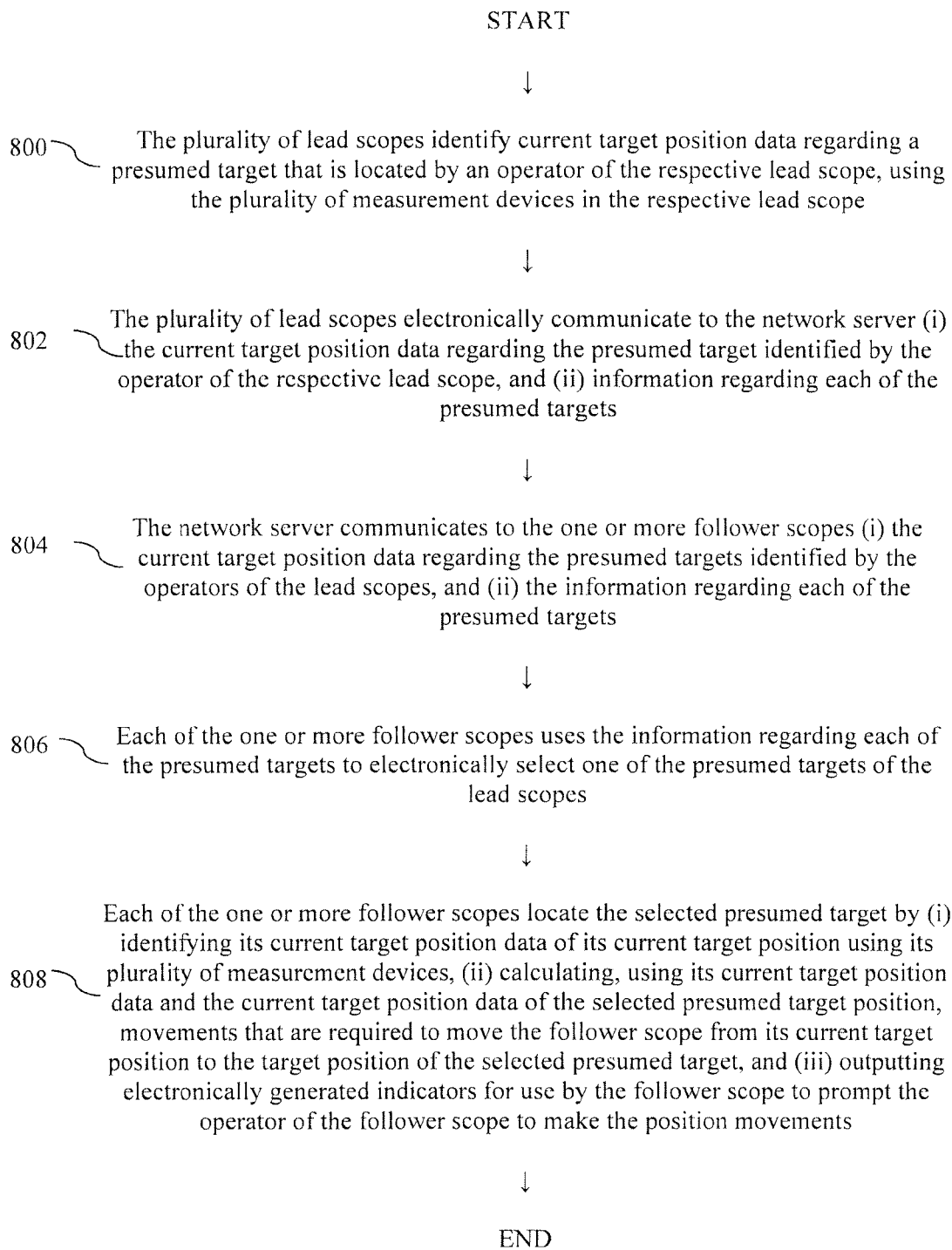

FIG. 8 is a flowchart of a process for tracking a plurality of presumed targets by a plurality of lead scopes and one or more follower scopes located remotely from one another and being moved by separate scope operators, wherein each of the scopes include a plurality of measurement devices configured to provide current target position data, and each of the scopes are in electronic communication with a network server. In one preferred embodiment the process is implemented by at least the following steps:
800: The plurality of lead scopes identify current target position data regarding a presumed target that is located by an operator of the respective lead scope, using the plurality of measurement devices in the respective lead scope.
802: The plurality of lead scopes electronically communicate to the network server (i) the current target position data regarding the presumed target identified by the operator of the respective lead scope, and (ii) information regarding each of the presumed targets.
804: The network server communicates to the one or more follower scopes (i) the current target position data regarding the presumed targets identified by the operators of the lead scopes, and (ii) the information regarding each of the presumed targets.
806: Each of the one or more follower scopes uses the information regarding each of the presumed targets to electronically select one of the presumed targets of the lead scopes.
808: Each of the one or more follower scopes locate the selected presumed target by (i) identifying its current target position data of its current target position using its plurality of measurement devices, (ii) calculating, using its current target position data and the current target position data of the selected presumed target position, movements that are required to move the follower scope from its current target position to the target position of the selected presumed target, and (iii) outputting electronically generated indicators for use by the follower scope to prompt the operator of the follower scope to make the position movements. The operator of the follower scope uses the indicators to reposition the follower scope from its current target position so as to move towards the target position defined by the current target position data of the selected presumed target.

T. Additional Details for GPS Compassing

As discussed above, VectorNav Technologies, LLC markets a device that includes a dual-antenna feature for providing GPS compassing. Inertial Sense, LLC also markets a device under the name "µINS-Dual Compass" that provides similar GPS-Compassing functionality. The µINS-2-Dual Compass includes additional capabilities to improve the detected location data (Real-time kinematic or RTK) and two receivers to simultaneously receive GPS data from two precisely positioned antennas to enable accurate GPS heading determination from a static position. Both of these devices are suitable for use in the present invention.

U. Additional Details for Node Communication

The devices/nodes in FIGS. 1A and 1B may connect to public and private databases, application servers, and other voice and data networks via an internet connection or via a private data communications capability linked to a base station or an MSC.

V. Additional Details Regarding Target Information

Regarding the example use case discussed above of connected rifle scopes, additional voice and data information may be exchanged by the hunters, such as verification that the specific target of interest (here, the prey) is within the legal limits for hunting.

W. Additional Details of Error Indicator

As discussed above, an error box may be overlaid around the presumed target position on a display screen of the device. The error box is based on the combination of the errors introduced by the lead scope and further error introduced by the follower scope. The error introduced by the lead scope and follower scope is a function of, among other things, the accuracy of the sensors for position, range and orientation, range to target and the optical characteristics of each scope.

X. Additional Details for Image Display and Simulation

As discussed above, IAMS may be used to allow a target to be rotated so that it appears properly positioned with respect to the follower scope. In the example discussed above, the IAMS can rotate the simulated deer by 90 degrees and communicate a side view of the deer for display on the follower scope so that the follower scope knows what the deer is likely to look like. Furthermore, using augmented reality techniques, the processor in the follower scope may overlay the simulated rotated image of the deer with the actual image captured by the follower scope when the follower scope is pointing at the target area.

Y. Additional Details for Target Marking

As a further enhancement to the process of target marking, a night vision goggle viewable laser may be used to mark the target. If the follower scope has night vision capability, once the follower scope is pointed at the correct area of interest, it would be able to verify that it was looking at the correct target by observing the laser on the target.

Z. Smartphone Device/Mobile Device

As described in the Definitions section, the device may be "handheld" and certain types of devices are themselves "scopes." In one preferred embodiment, the handheld device is a smartphone/mobile device (hereafter, referred to as a "mobile device") that uses an application (app) installed therein, data from sensors that are pre-installed within the mobile device, and the mobile device's processor and networking components, to allow the mobile device to function as a scope.

For example, rangefinder apps which allow a mobile device to function as a scope are well-known in the art. One suitable rangefinder app is "Whitetail Deer Hunting Range Finder for Hunting Deer," commercially available from GuideHunting L.L.C.

AA. Vehicle-Mounted and Aerial-Mounted Devices, and Fixed Position Devices

Figure 9A:
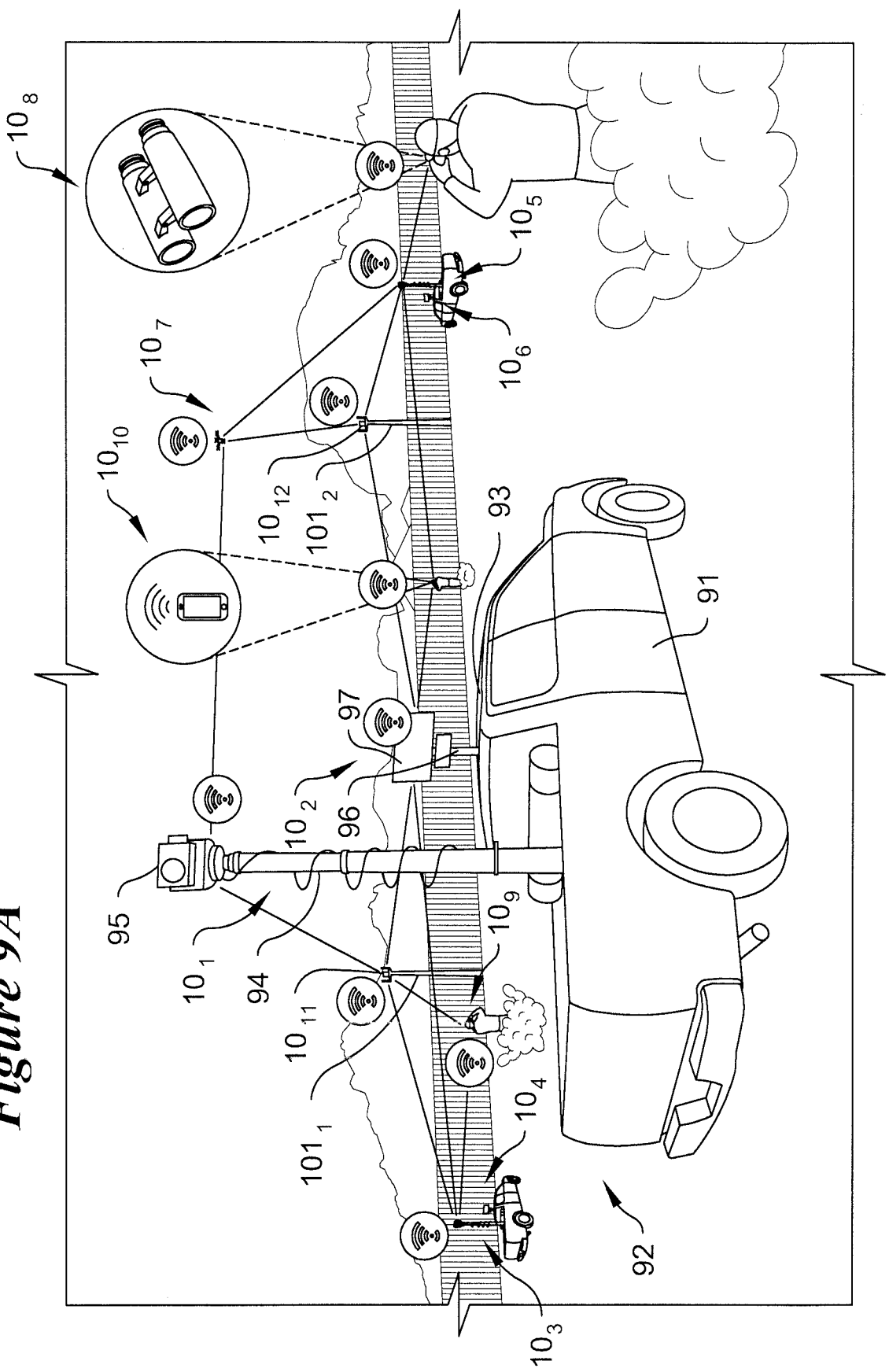
FIG. 9A is a schematic diagram of a surveillance environment having a plurality of scopes, some of which are vehicle-based.

As described in the Definitions section, the devices may be handheld or may be mounted on a land, aerial or water based vehicle. When mounted, the device mount will typically have a pan-tilt mechanism (described in more detail below) to allow for precise positioning of the scope associated with the device. The vehicle-based devices are inherently mobile. Other devices may be in fixed positions. FIG. 9A shows one preferred embodiment of a surveillance environment having a plurality of devices, some of which are handheld, some of which are in fixed positions, and some of which are aerial or vehicle-based. FIG. 9B shows one of the vehicles in FIG. 9A having vehicle-based devices mounted to or integrated therein. Referring to FIGS. 9A and 9B, the following types of devices are shown:

1. Vehicle-mounted devices 101-106. There are up to six vehicle-mounted devices shown in FIG. 9A because three vehicles 90 are shown (FIG. 9B shows one of the vehicles), and one preferred embodiment of a vehicle may have up to two devices 10 mounted thereon. This type of vehicle may be a truck-like vehicle 91 having the following structure:
   i. A flatbed 92.
   ii. A retractable sunroof/moonroof 93 (hereafter, referred to as a "sunroof"), preferably, having a horizontally retractable mechanism.
   iii. A first retractable telescoping structure 94 having a first set of surveillance equipment 95 mounted thereon, and being mounted on the flatbed 92 of the vehicle 10, wherein the first retractable telescoping structure 94 retracts to a form factor that allows it to be completely stored in the flatbed and fully covered by a flatbed cover. The first set of surveillance equipment 95 may include one of the devices 10. In its fully extended, upright position, the first retractable telescoping structure 94 effectively functions as a mast, and the first set of surveillance equipment 95 is preferably mounted at or near a top portion of the mast.
   iv. A second retractable telescoping structure 96 having a second set of surveillance equipment 97 mounted thereon, and being mounted completely inside of the vehicle when fully retracted, and extending partially through the sunroof 93 when in use. The second set of surveillance equipment 97 may also include one of the devices 10. In its fully extended, upright position, the second retractable telescoping structure 96 also effectively functions as a mast, and the second set of surveillance equipment 97 is preferably mounted at or near a top portion of the mast.
   v. A sealing device (not illustrated) to inhibit water and dirt from entering the vehicle compartment through the open sunroof 93 when the second retractable telescoping structure 96 is in use.

The first and/or second set of surveillance equipment 95, 97 may also include the plurality measurement devices described above that are necessary to provide current target position data. Accordingly, in this embodiment, either or both sets of surveillance equipment 95, 97 may include one of the devices 10.

2. Aerial-mounted device. An aerial-mounted device $10_7$ is shown in the form of a drone. The drone may include the plurality measurement devices described above that are necessary to provide current target position data.

3. Handheld devices $10_8$-$10_{10}$. Device $10_8$ is binoculars which a person looks through to locate or follow a target. Devices $10_9$ and $10_{10}$ are mobile devices, such as smartphones, being carried and operated by respective persons. As described above, these handheld devices function as scopes.

4. Fixed devices $10_{11}$-$10_{12}$. Two fixed towers $101_1$ and $101_2$ are shown in FIG. 9A. The fixed towers 101 may serve one or both of the following purposes:
   i. A fixed tower 101 may include its own fixed device 10 having a scope integrated therein.
   ii. A fixed tower 101 may receive data from one or more of the vehicle-mounted devices 10 and handheld devices 10 for subsequent relaying to a network server. This type of fixed tower is a non-device/non-scope node 12, as described above with respect to FIGS. 1A and 1B.

Referring again to FIGS. 1A and 1B, each of the devices 10 may function as a node 24 in the wireless communication and electronic network 18 described above.

In FIG. 9A, the GPS coordinates of any of the devices 10 may be shared. In FIG. 9A, the devices 10 are shown in close proximity to each other. However, this is just for illustration purposes so as to show a plurality of different types of devices in the same surveillance environment. The devices 10 may actually be miles away from each other, such as 5-10 miles from each other. The sensors on the devices 10 may have large ranges, such as up to 7.5 miles for target detection. Accordingly, FIG. 9A is not to scale.

Devices 10 which are on a fixed platform, such as a fixed tower 101 or a mast of a non-moving vehicle, may include optical sensors that allow for wide area imaging, such as described in U.S. Pat. No. 9,813,618 (Griffis et al.), which is incorporated by reference herein, so as to produce single composite or panoramic images of up to 360 degrees coverage.

If the vehicle is water-based, minor position compensations must be made for the motion of the water.

AB. Integration of Scope into Device

As described in the Definitions section, the device is the object that a scope is integrated into, and certain types of devices are themselves "scopes," such as binoculars, telescopes and spotting scopes. Different approaches to integrating the scope into a device are possible. For example, the scope can be integrated into the device by being mounted to the device (e.g., physically or electronically connected to a mast, tower, or drone), as shown in FIG. 9A. Moreover, integrating the scope into the device allows the scope to use existing sensors and other components of the device, in lieu of duplicating such sensors and components. For example, a drone or mobile device (e.g., smartphone) may have an existing camera, sensor, and processor, and can be converted to a scope by adding software to enable the drone to act as a lead or follower scope. Furthermore, any of the scopes integrated into the devices shown in FIG. 9A may act as a lead or follower scope.

AC. Vehicle Mobility Embodiments

The use of vehicles which effectively "carry" device-mounted or device-integrated scopes allow for implementing new types of target tracking processes, some of which are described in the exemplary examples below. That is, in these examples, at least one of the scopes is mounted to or integrated into a movable vehicle. For simplicity of explanation, these examples refer to "scopes" and not "devices," but it should be understood that the scopes are integrated into, or are themselves, "devices." Also, for simplicity, the presumed target is referred to as simply the "target."

Example 1

1. A first scope scans an area and identifies a stationary or moving target (i.e., object of interest), and reports position data of the target either directly to a second scope, or to a network server that the second scope is in communication with so as to obtain the position data.

2. The second scope obtains the position data and is provided with position movement (re-positioning data) so as to locate the target.

3. Upon the second scope locating the target, the vehicle that the second scope is mounted to or integrated into is directed to move to a new and "better location" (improved location) for the second scope to view the target. A better location may be defined by one or more factors, such as being closer to the target, having a less obstructed view of the target, being at a higher elevation to view the target, or being at the best position for capturing biometric data of the target (e.g., a face of a person or animal). The improved location may be improved relative to the vehicle's current position, and/or improved relative to the current location of the first scope.

4. The second scope also reports back the target position data directly to the first scope, or to a network server that the first scope is in communication with so as to obtain the position data. The first scope may then use this position data to assist in better identifying position data of the target.

In the case of a vehicle such as the truck described above wherein one of the scopes is integrated into a device which is mounted on the truck, the truck operator may receive directions (position movements) regarding where to move the truck, so that a mast-mounted scope can better see the target. Once the truck is in a better location, it may still be necessary for the scope to be re-oriented/repositioned. Thus, the process for getting the second scope into the best position to view the target may involves two separate and processes, namely (1) moving the vehicle (that the second scope is mounted to or integrated into) to a better location, and (2) re-orienting/repositioning the second scope. This process may be iterative, in that the second scope may be continuously re-oriented/repositioned as the vehicle position changes.

Example 2

1. A first scope scans an area and identifies a stationary or moving target (i.e., object of interest), and reports position data of the target either directly to a vehicle which is remote from the first scope and that includes the second scope mounted to or integrated therein, or to a network server that the vehicle is in communication with so as to obtain the position data.

2. The vehicle that the second scope is mounted to or integrated into obtains the position data and is provided with position movement data so as to move the vehicle to a particular location (e.g., the "better location" described above) that would allow the second scope to view the target.

3. The second scope then attempts to locate the target using the position data from the first scope. The vehicle and/or the second scope may then be iteratively moved or re-positioned in the same manner as described above in Example 1.

Example 2 differs from Example 1 in that the second scope does not attempt to locate the target until the vehicle is first moved to a new location based on the position data of the target received from the first scope.

Example 3

This example illustrates another embodiment that relies upon a network of scopes, as shown in FIGS. 1A and 1B. In this embodiment, the first scope or the network server has knowledge of the position of the other scopes.

1. A first scope, which initially acts as a lead scope, scans an area and identifies a stationary or moving target (i.e., object of interest), but the first scope has a poor view of the target.

2. The first scope or the network server uses the positions of the other scopes to identify a second scope from among the scopes in the network that likely has the best view of the target.

3. The first scope or the network server directs the second scope to locate the target using the position data from the first scope.

4. The second scope then takes over as the lead scope, and sends its newly collected target position data to the other scopes (including the first scope) so that the other scopes can better locate and track the target.

The scope with the best view may be a scope within the network of scopes that is closest to the target, has the least obstructed view of the target, is at the best elevation to view the target, is in the best position for capturing biometric data of the target (e.g., a face of a person or animal), or is in the best position to shoot a projectile (e.g., bullet) at the target or at a specific part of the target.

The scope that has the best view may not necessarily be a vehicle-mounted or vehicle-integrated scope. However, if the scope that has the best view is a vehicle-mounted or vehicle-integrated scope, then an alternative embodiment of this example may be similar to Example 2 wherein the second scope does not attempt to locate the target until the vehicle associated with the second scope that is believed to have the best view is first moved to a new location based on the position data of the target received from the first scope.

This example, other than the alternative embodiment, may also be implemented even if none of the scopes are vehicle-mounted or vehicle-integrated, since a vehicle is not a necessary component of the process.

AD. Scope Movements and Vehicle Movements

In the embodiments described in FIGS. 1-8, the operator of the second scope uses indicators to re-position the second scope from its current target position so as to move towards the target position defined by the current target position data received from the first scope. However, in the embodiment of FIG. 9A, some of the scopes are not physically moved by operators, such as the scopes mounted on the mast of a vehicle or fixed tower. Accordingly, in these embodiments, the second scope uses electronic control signals to re-position the second scope from its current target position so as to move towards the target position defined by the current target position data received from the first scope. This may involve physically or electronically rotating and/or pivoting the second scope with respect to its mounting, such as by using a pan-tilt mechanism described below, and/or by changing optical parameters of the second scope. An operator may direct such re-positioning movements by viewing a display of the second scope, and causing appropriate electronic control signals to be generated. For example, the processor of the second scope may output electronically generated indicators that are shown on a display of the second scope to prompt the operator of the second scope to make the position movements in a manner similar to the embodiments described above with respect to FIGS. 1-8. The operator may then use the electronically generated indicators to make control inputs to an operator-controlled game controller or other pointing device (also, referred to herein as "an operator-controlled input device") which are translated into the electronic control signals to move the pan-tilt mechanism and/or to change optical parameters of the second scope. The operator and the display of the second scope is preferably in or near the vehicle that the second scope is mounted to or integrated into. This embodiment is illustrated in FIG. 12A.

Alternatively, there is no operator involvement with the scope movements, and the calculated position/re-positioning movements are directly inputted into a processor to generate the electronic control signals that physically or electronically rotate and/or pivot the second scope with respect to its mounting, and/or change optical parameters of the second scope. This embodiment is illustrated in FIG. 12B. The same processor may be used to calculate the position movements and generate the electronic control signals, or a first processor may be used to calculate the position movements, and a second processor (such as a processor dedicated to the pan-tilt mechanism) may be used to generate the electronic control signals.

In the embodiment of FIG. 9A, there are two positioning changes that can be made to track a target position, namely, a location movement of the vehicle that the scope is mounted to or integrated into, as well as positioning changes regarding the scope itself, which may be physical or electronic, depending upon the type of device that the scope is integrated into, as well as the type of scope itself. Regarding the location movement of the vehicle, one embodiment may operate as follows:

1. The network server uses the position data of the target from the second scope (Example 1) or the first scope (Example 2) to determine the improved location for the vehicle based on any of the previously identified factors.

2. The location of the vehicle is provided by conventional GPS data.

3. The improved location is plugged into a conventional mapping program (e.g., GOOGLE Maps, APPLE Maps) as a destination, and conventional prompts may be given to the vehicle operator to move the vehicle to the improved location for allowing the second scope to view the target from the improved location. For off-road movement applications, topographical maps may be used and the vehicle is repositioned using the shortest path to the improved position that is feasible based on any determined terrain obstructions that are identified as being between the vehicle and the target location.

AE. Elevation Calculations

As discussed above, an elevation sensor may optionally be used to improve the accuracy of the elevation determined by the GPS/INS. In an alternative embodiment, accuracy may be improved by overlaying GPS coordinates on a topographical map. The elevation on the topographical map is then compared to the elevation determined by the GPS/INS, and adjustments may be made. For example, if the GPS/INS indicates an elevation of 10 feet, but the topographical map shows the position coordinates to be at 20 feet, a suitable algorithm may be employed to select the elevation, such as by averaging the two values, or weighting one value more than the other, or by factoring in a neighboring (different) elevation on the topographical map if the position coordinates are close to a neighboring elevation after accounting for errors in the GPS/INS values. The elevation calculations should also factor in known characteristics of the devices and their associated scopes, such as the height of a mast to which the scope is mounted, or the height of the scope operator.

AF. Autonomous Vehicles

In one preferred embodiment, the vehicle is user-operated, and a vehicle operator who is physically present in the vehicle causes the vehicle to be moved from position to position, such as when implementing the vehicle movement described above in Examples 1 or 2. However, in an alternative embodiment, one or more of the vehicles are autonomous vehicles. An autonomous vehicle, also known as a self-driving vehicle, robot vehicle, or driverless vehicle, is a vehicle that is capable of sensing its environment and moving with little or no human input. Autonomous vehicles combine a variety of sensors to perceive their surroundings, such as radar, computer vision, Lidar, sonar, GPS, odometry and inertial measurement units. Advanced control systems interpret sensory information to identify appropriate navigation paths, as well as obstacles and relevant signage (if the vehicle is on a road).

The vehicle which includes a lead scope or a follower scope mounted to or integrated therein may be autonomous. For example, a lead scope may search for a target, and then the vehicle which includes a follower scope mounted to or integrated therein may look for the target autonomously. More specifically, the vehicle which includes a follower scope mounted to or integrated therein will be moved to the appropriate position as described above in Examples 1 or 2. In the autonomous vehicle embodiment, position movement instructions for the vehicle are automatically implemented, instead of being provided to a vehicle operator for implementation.

AG. Calculation of Improved Location for Viewing the Presumed Target ("Target")

The improved (better) location of a vehicle having a second scope mounted to or integrated into the vehicle will meet one or more of the following conditions relative to the vehicle's first position, or the position of the first scope:
  (i) closer to the target,
  (ii) provides a less obstructed view of the target,
  (iii) at a higher elevation to view the target, (iv) at a better position for capturing biometric data of the target, and (v) better position to shoot a projectile (e.g., bullet) at the target or at a specific part of the presumed target.

The algorithm for relocating the vehicle will be different depending upon which of these conditions are most important, the type of target (also, referred to as "the target"), and what actions, if any, need to be taken with respect to the target. The algorithm also depends upon factors such as scope optics and terrain issues.

Consider an example wherein the target is a person or animal (a "person" is used in the following description for convenience of explanation), and it is necessary for the second scope to see facial details of the person so as to track the person and/or perform facial recognition of the person. The goal, or at least the initial goal, is not to come right up to the target, but instead the goal is to be positioned at a sufficiently close distance so that the target can be viewed, typically in a covert manner. Thus, there may be a minimum distance that should be kept between the scope and the target, such as 50 meters.

As is well-known in the art, facial recognition typically involves collecting dozens of facial features (often referred to in the art as "facial landmarks") of the person of interest, and then using an algorithm to create a facial signature for the person. The facial signature is then compared to a database of known faces to potentially identify the person, assuming that their facial signature is in the database. Alternatively, once the facial signature is obtained from the first scope, the second scope may use the facial signature to confirm that they are viewing the same person, or vice-versa, regardless of whether or not the person is identified in a database of known faces.

Facial signatures and facial recognition typically require that the viewer (here, a scope) be within a predefined viewing angle (arc) of the person's face so as to capture a minimum set of facial features that become the inputs to the algorithm. Thus, it is not necessary for the viewer to be directly facing the person's face, but the viewer cannot be facing the back of the person's face. Of course, the more facial features that can be captured, the more accurate the facial signature will be.

The first step in the process is to calculate how close the scope must be to the person so as to capture sufficient facial features that would allow the algorithm to obtain an accurate facial signature. This will depend on algorithm inputs since different algorithms use different facial features, and it will also depend upon scope optics such as lens quality, optical zoom, and the quality of any digital zoom. This distance may be determined experimentally before a scope is deployed in a surveillance environment. Consider an example wherein a scope containing very high quality optics can create accurate facial signatures at distances up to 150 meters. This means that the scope (and thereby the vehicle that has the scope mounted to or integrated therein) should be positioned 150 meters or less from the target.

The second step in the process is to calculate the angle that the scope should be positioned with respect to the person so as to be within the predefined viewing angle (arc) of the person's face, and ideally pointing towards the person's face. If the person is not stationary, a movement detection algorithm may be employed to detect the general direction of the person's movement, which will provide the appropriate viewing angle. If the person is stationary, it may be necessary to get close enough to the person to initially detect which direction their face is pointing, and then the appropriate viewing angle can be determined. The distance to the person for making this determination would typically be much greater that the distance required to capture the minimum set of facial features that is necessary for the facial recognition algorithm. For example, the direction that a person's face is pointing may be discernible at distances up to 300 meters.

The distance and angle data are then used to determine one or more suitable locations to reposition the vehicle so that the scope can view the person using the most current target position data that is available. Once a location or set of locations is determined, conventional GPS routing techniques/mapping software may be employed to generate position movement instructions for the vehicle while also avoiding terrain obstructions for any portion of the directions that involve off-road driving. Furthermore, terrain obstructions not only may require modifications to the position movement instructions, but may also factor into where best to reposition the vehicle so that the target can be viewed by the scope that is mounted to or integrated into the vehicle.

The same process described above is also suitable for identifying the best scope to select as a follower scope after a lead scope identifies a target when the surveillance environment includes a network of devices, each of the devices have a scope mounted to or integrated, or wherein the device itself is a scope.

Figure 11A:
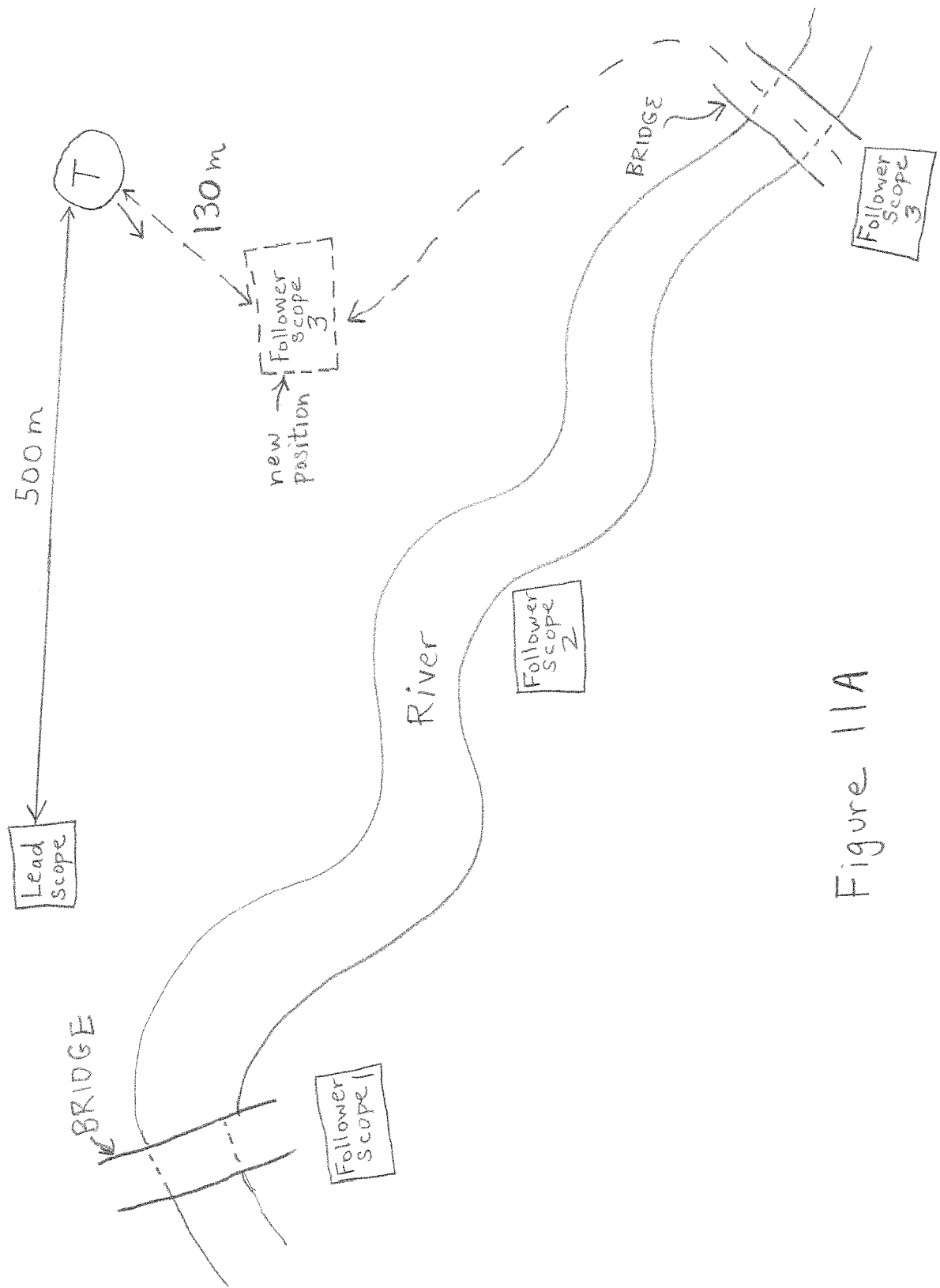
FIGS. 11A-11D show surveillance environments having a plurality of scopes and a presumed target in accordance with preferred embodiments of the present invention.

Consider, for example, the surveillance environment shown in FIG. 11A wherein there is a lead scope that has identified a target, T, at a distance of about 500 meters. The target T is walking towards a river in a southwestern direction. Three follower scopes 1-3 are in the surveillance environment, and each of these scopes has the ability to perform facial recognition at a distance of 150 meters or less. In this example, follower scope 3 would be directed to move to a new location that is 130 meters from the most current target position because the follower scope can more quickly get to a suitable location to view the target compared to follower scopes 1 and 2. While the follower scope 2 is initially closer to the target, the follower scope cannot get close enough to a location that is 150 meters or less from the target unless it takes a long route to get over one of the bridges. While the follower scope 1 is right near one of the bridges, it is farther away from a suitable viewing location than follower scope 3.

Figure 11B:
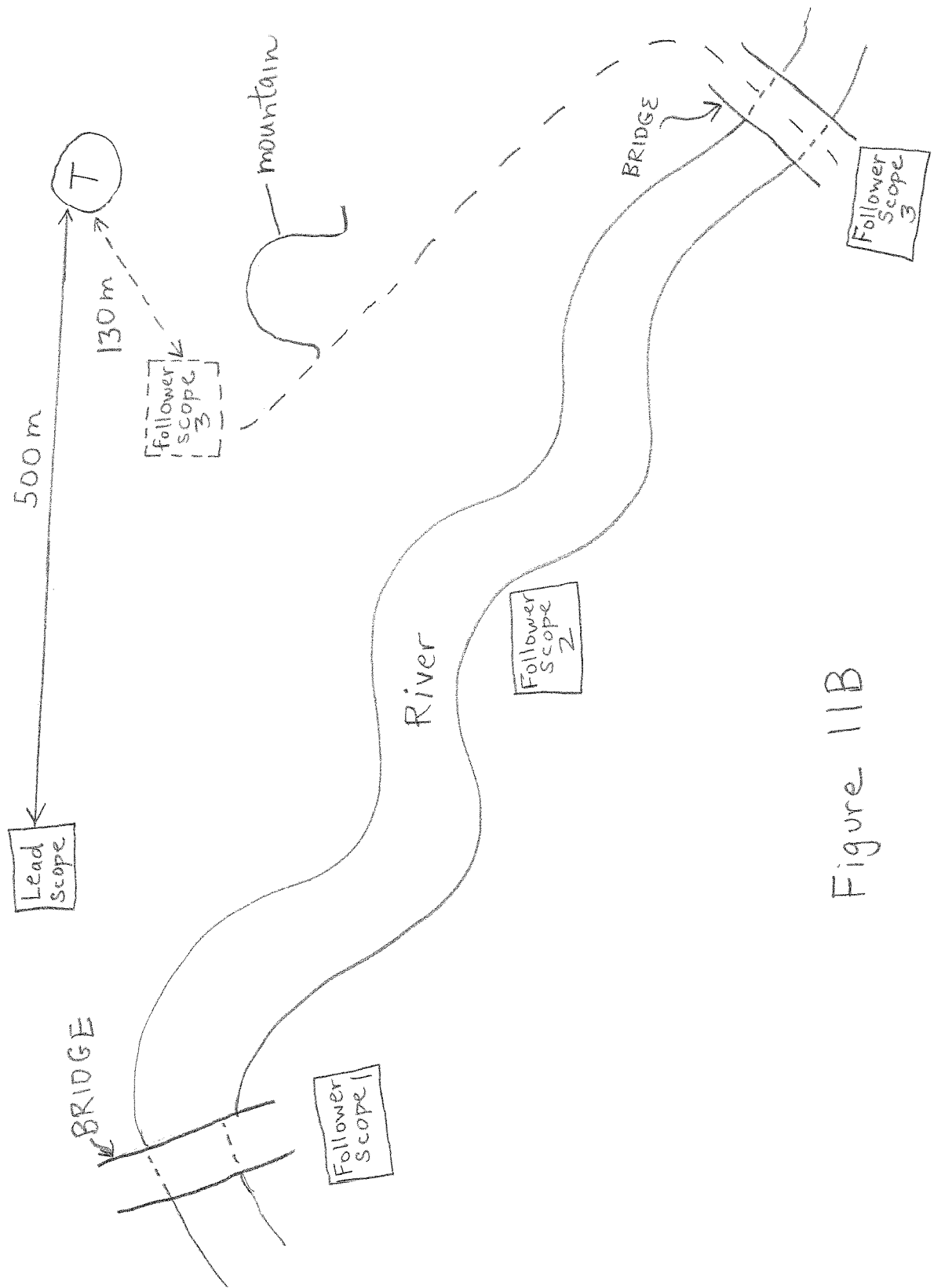

FIG. 11B is shows a similar surveillance environment as FIG. 11A, except that a mountain would obstruct the view of the target if the follower scope 3 was moved to the position shown in FIG. 11A. Accordingly, the mapping software directs the follower scope 3 to a slightly further location that is also 130 meters from the target, but where there is no such viewing obstruction. The mapping software may operate in an iterative manner as follows, prior to generating any final position movement instructions:

Step 1. Calculate an initial location that should allow the scope to view the target (e.g., 130 meters from the target, and generally facing the direction that the target is moving in, or generally facing the front of the target).

Step 2. Using topographical map data and terrain obstruction data, determine if the scope can actually view the target at the initial location (e.g, no hills/ridges, mountains, trees in line of sight).

Step 3. If the scope would not likely be able to view the target, move to another nearby location that should allow the scope to view the target, and which is also greater than a predetermined minimum distance from the target so as to maintain a covert surveillance.

Step 4. Iteratively repeat steps 2 and 3 until a suitable location is identified.

Step 5. Identify the best candidate for the follower scope based upon (i) the physical ability of the follower scopes to reach the suitable location from their respective current locations (e.g., a vehicle cannot cross a river), and for the scopes that can physically reach the suitable location, (ii) the time and effort required to reach the suitable location from their respective current locations. This step would be skipped if the follower scope is pre-identified, or if there is only one possible candidate for the follower scope.

Step 6. Generate position movement instructions for the vehicle associated with the selected follower scope.

In this manner, the mapping software effectively simulates a plurality of potential new locations, and then determines if the new locations are suitable for moving a vehicle to. The mapping software also preferably identifies areas that a vehicle should not drive through (e.g., swamp, roadless forest, rough terrain) when selecting the appropriate scope, and when generating the position movement instructions for the vehicle associated with the selected scope.

Topographical data is not only useful for selecting locations that are not obstructed by topographical features, but may also be used to select a better location from among multiple unobstructed locations. For example, if there are two suitable locations that are both about equidistant from the target, topographical data may be used to identify the location that is higher in elevation, since looking down on the target is typically a better vantage point than looking up at the target.

If one of the potential uses for the scope is to shoot a projectile (e.g., bullet) at the target or at a specific part of the target, additional factors should be taken into account when selecting the new position. Consider, for example, that the target is a large animal that is ideally killed by being hit in a chest area by a rifle having a scope mounted thereto. Factors to be taken into account include the orientation of the scope with respect to the target (ideally, the scope should be facing the chest area), the expected range of rifle to inflict a deadly shot, and a minimum distance that should be kept from the animal to avoid detection by the animal of the scope's presence. The location that most ideally faces the chest area may be determined using similar processes described above regarding facial recognition, wherein the known anatomy of the animal's body is used to calculate the appropriate angle of view.

Figure 11C:
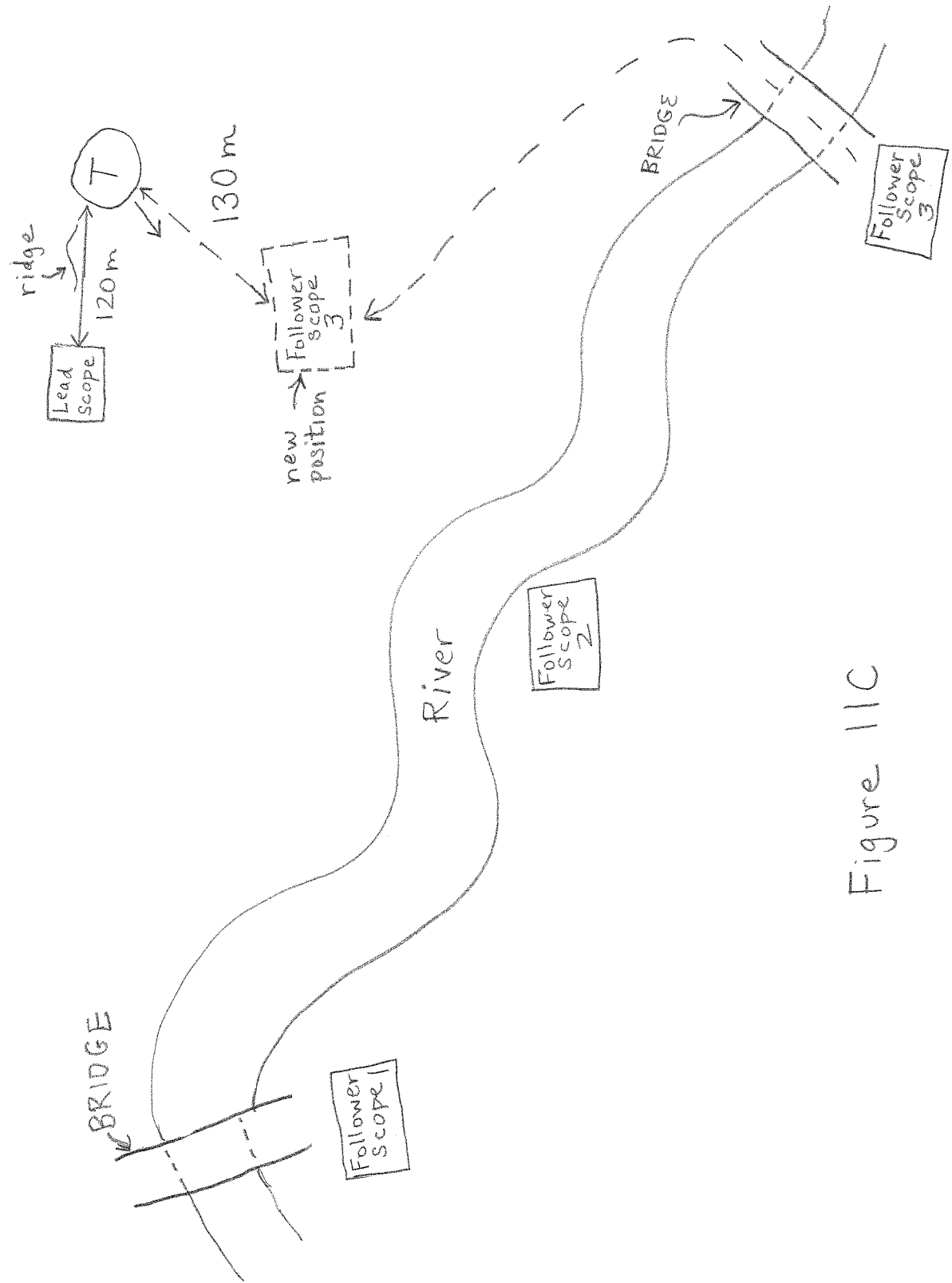

In some instances, the lead scope may be relatively close to the target, but has a partially obstructed view, and the goal is to position another scope to have a better view. For example, referring to FIG. 11C, the lead scope is only 120 m from the target, but has a partially obstructed view of the target due to a small ridge in its sight line. Here, the mapping software directs the follower scope 3 to the same position as shown in FIG. 11A, which is 130 m from the target. Thus, while the follower scope 3 is slightly farther from the target than the lead scope, the follower scope has a better view of the target. Alternatively, even if the ridge in FIG. 11C was not present, topographical data may indicate that the new position for the follower scope 3 is at a higher elevation than the target, compared to the elevation of the lead scope's position, and thus the follower scope 3 would be in a better position to view the target by virtue of its higher elevation.

Figure 11D:
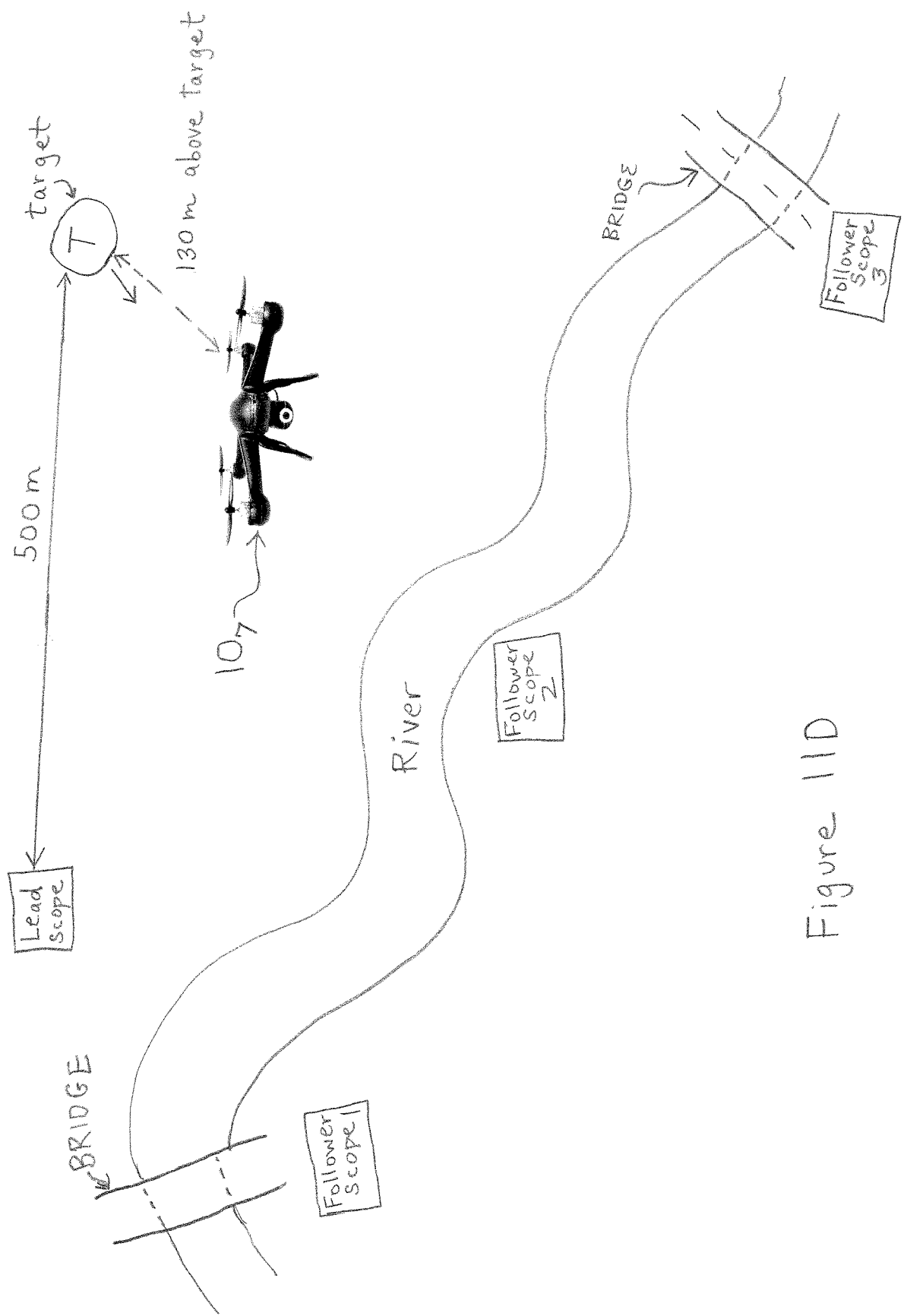

In some instances, the mapping software may determine that it is not possible for any of the follower scopes 1-3 to reach a suitable, unobstructed position to view the target, or that the time and effort to reach such a position is unacceptable. This may be due to impassable terrain obstructions, obstructions near the target, long travel distances, or safety concerns. In this situation, an aerial-mounted device may be deployed as the follower scope for viewing the target. Referring to FIG. 11D, the aerial-mounted device $10_7$ (drone) shown in FIG. 9A may be deployed to hover over the target at a distance of 130 m from the target. As discussed above, the device $10_7$ (drone) may include the plurality measurement devices described above that are necessary to provide current target position data. The device $10_7$ (drone) may be launched from one of the vehicles associated with the follower scope 1-3, or it may be present at a different location than any of the follower scopes 1-3, but still within the surveillance environment, and is ready to be deployed, if necessary.

AH. Pan-Tilt Gimbal Mechanism

In one preferred embodiment, the follower scope is manually moved by hand movements and body rotation. In another preferred embodiment, the follower scope is connected to a pan-tilt mechanism, and is moved via an operator-controlled game controller or other pointing device (operator-controlled input device) which directs the pan-tilt mechanism. In yet another embodiment, the pan-tilt mechanism is moved in a completely automated manner via signals that are sent to move the pan-tilt mechanism to position or re-position the follower scope to point at the target position. No operator input is provided in the completely automated embodiment. The follower scope having the pan-tilt mechanism may be vehicle-mounted (e.g., at the top of the mast of land-based vehicle, connected to a drone), or may be mounted to the top of a fixed tower.

For example, in a completely automated embodiment, one or more of the follower scopes is mounted to a pan-tilt mechanism or other pointing or orienting device to automatically re-position the follower scope from its current position to the target position defined by the target position data received from the lead scope. In this embodiment, user prompts may be eliminated or used in combination with the automated movement of the follower scope. In this embodiment, the lead scope and follower scope can be "locked" such that each position movement of the lead scope to track a target will automatically and continuously cause one or more of the follower scopes to be re-positioned in order to view the target identified by the lead scope.

In one preferred embodiment wherein the pan-tilt mechanism is used in a land-based vehicle, sensors are incorporated into a precision, gyro-stabilized, motor driven, pan-tilt gimbal, which is under program control. The gimbal provides precise motion control, capable of various speeds of motion and aiming accuracy on both pan and tilt axes. The gimbal allows for the pan axis to be rotated continuously 360 degrees, while simultaneously the tilt axis can look down to 45 degrees below the horizon, and 90 degrees up to vertical. Electro-mechanical stabilization provides a stable video image. Gimbal-based pan-tilt mechanisms are well-known in the art. Two examples of a gimbal-based pan-tilt mechanism that is suitable for use in the present invention are described in U.S. Patent Application Publication Nos. 2017/0302852 (Lam) and 2007/0050139 (Sidman), both of which are incorporated by reference herein.

When the pan-tilt mechanism is mounted to a vehicle, it is necessary to know the orientation of the vehicle so that appropriate adjustments can be made to the control signals given to the pan-tilt mechanism. Various techniques may be used to accomplish this goal.

In one embodiment, orientation sensors and GPS antennae (plural antennas) are mounted to the moving payload of the pan-tilt mechanism, here, the scope. These sensors report the position and orientation of the payload with respect to a fixed reference frame such as latitude, longitude, and altitude for position, and heading, pitch, and roll angles for orientation. In this embodiment, the reported position and orientation of the vehicle is that of the payload itself.

In another embodiment, orientation sensors and GPS antennae are mounted to the base of the pan-tilt mechanism. These sensors report the position and orientation of the base of the pan-tilt mechanism with respect to a fixed reference frame. The pan-tilt mechanism also has sensors that report the orientation of the pan-tilt payload relative to the base of the pan-tilt mechanism, as pan and tilt angles. These pan and tilt angles are relative to a reference or "home" position for the pan-tilt mechanism. The orientation of the pan-tilt payload relative to the fixed reference frame is then calculated by mathematically combining the orientation of the vehicle and the pan and tilt angles, with conventional methods using, for example, Euler (yaw, pitch, and roll) angles or quaternions.

In another embodiment, orientation sensors and GPS antennae are mounted to the host vehicle. These sensors report the position and orientation of the vehicle with respect to a fixed reference frame. The pan-tilt mechanism is installed on the vehicle with an orientation relative to the vehicle that may be represented with, for example, Euler angles. The pan-tilt mechanism has sensors that report the orientation of the pan-tilt payload relative to the base of the pan-tilt mechanism, as pan and tilt angles. The orientation of the pan-tilt payload relative to the fixed reference frame is then calculated by mathematically combining the orientation of the vehicle, the orientation of the base of the pan-tilt mechanism with respect to the vehicle, and the pan and tilt angles of the mechanism.

Other embodiments may include position and orientation sensors distributed across a number of components that can ultimately be combined in similar ways to calculate the orientation of a payload with respect to a fixed reference frame shared with other scopes participating in the system.

The pan-tilt gimbal mechanism may also be used on the lead scope, either as an operator-controlled version or as a completely automated version.

AI. Additional Details for Automatic Target Detection

As discussed above, automatic target detection may be performed using a lead scope which is programmed to search for a predefined target image, and then communicate the location of any identified target to the follower scope. In another embodiment of the present invention, the lead scope is vehicle or mast-mounted, and the lead scope is programmed to move in a search pattern through a designated area to look for particular types of targets using the above-described automatic target detection techniques. If a target is identified (e.g., search criterion is to search for a "human" and a "human" is identified), the target coordinates and optional image information is transmitted to one or more follower scopes. If the follower scope is hand-held or hand-controlled, the scope operator moves the scope to the received target position. Alternatively, if the follower scope is mounted to a pan-tilt mechanism and is fully automated (no scope operator), the follower scope automatically moves to the position designated by the lead scope.

A variety of search instructions can be programmed into a lead scope, such as changing characteristics of the lead scope as it moves through the search area. For example, the camera of the lead scope can be zoomed, switched from optical to thermal, and different filters can be applied during the search of the designated area to increase the possibility of finding the target that meets the specified requirements.

AJ. Additional Flowchart of Vehicle-Based Embodiment

Figure 10:
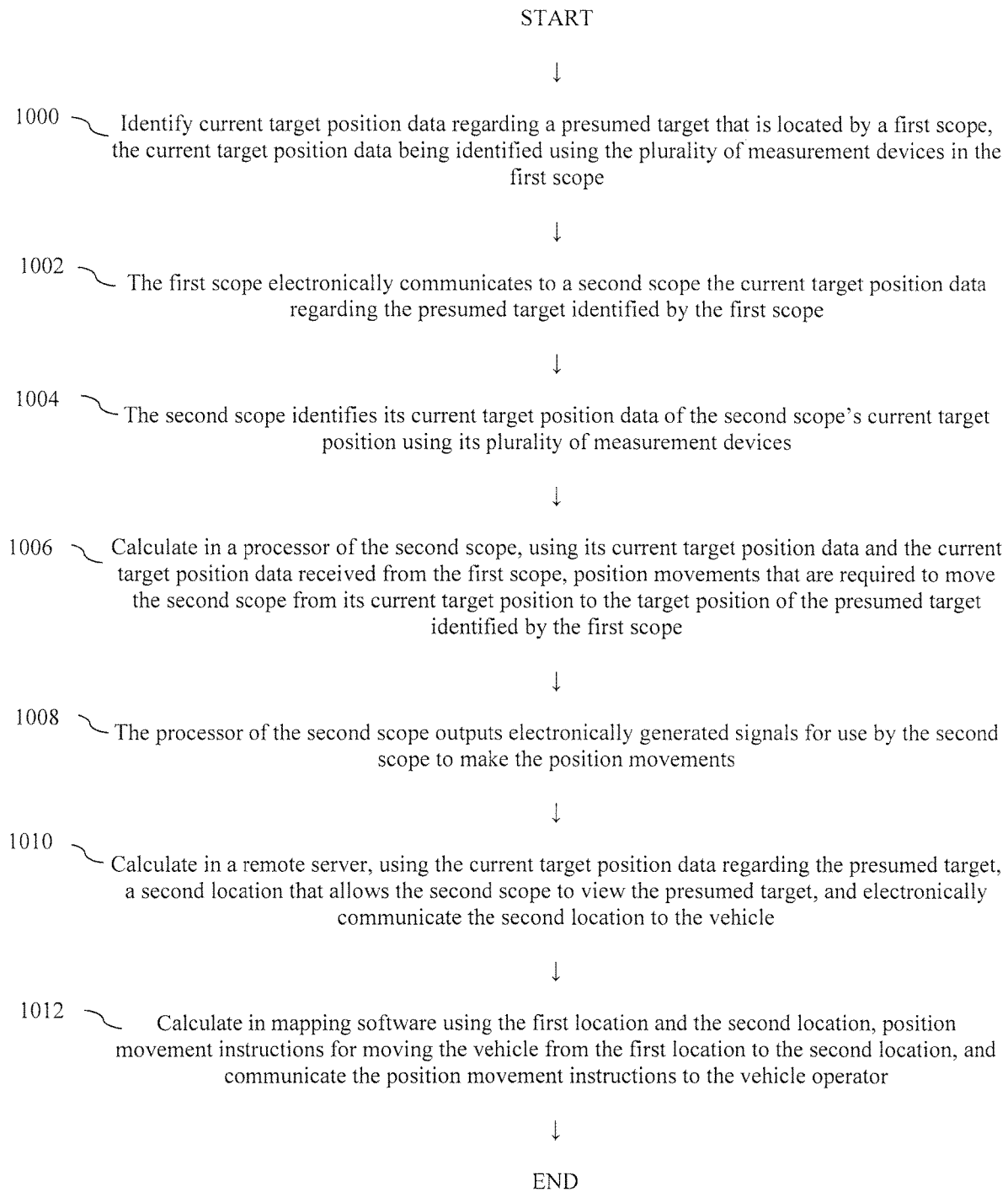
FIG. 10 is a flowchart in accordance with another preferred embodiment of the present invention.

FIG. 10 is a flowchart of one preferred embodiment of a target tracking process wherein one of the scopes used for target tracking is mounted to or integrated into a vehicle. In one preferred embodiment the process is implemented by at least the following steps:

1000: Identify current target position data regarding a presumed target that is located by a first scope, the current target position data being identified using the plurality of measurement devices in the first scope.

1002: The first scope electronically communicates to a second scope the current target position data regarding the presumed target identified by the first scope.

1004: The second scope identifies its current target position data of the second scope's current target position using its plurality of measurement devices.

1006: Calculate in a processor of the second scope, using its current target position data and the current target position data received from the first scope, position movements that are required to move the second scope from its current target position to the target position of the presumed target identified by the first scope.

1008: The processor of the second scope outputs electronically generated signals for use by the second scope to make the position movements.

1010: Calculate in a remote server, using the current target position data regarding the presumed target, a second location that allows the second scope to view the presumed target, and electronically communicate the second location to the vehicle.

1012: Calculate in mapping software using the first location and the second location, position movement instructions for moving the vehicle from the first location to the second location, and communicate the position movement instructions to the vehicle operator.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A system for tracking a presumed target using scopes that are remotely located from each other, the presumed target having a target position, the system comprising:
   (a) a first scope including:
      (i) a first plurality of measurement devices, and
      (ii) a first processor configured to:
         (A) identify current target position data regarding a presumed target that is located by the first scope, the current target position data being identified using the plurality of measurement devices in the first scope, and (B) electronically communicate the current target position data regarding the presumed target identified by the first scope to a computer via an electronic network; and (b) a second scope mounted to a pan-tilt mechanism, the second scope including:
(i) a second plurality of measurement devices, and
(ii) a second processor configured to:
(A) identify current target position data of the second scope's current target position using the second plurality of measurement devices in the second scope;
(B) communicate with the computer via the electronic network to receive the current target position data regarding the presumed target identified by the first scope;
(C) calculate, using its current target position data and the current target position data received from the first scope, position movements that are required to move the second scope from its current target position to the target position of the presumed target identified by the first scope, and
(D) output electronic control signals for use by the second scope to make the position movements,
wherein the electronic control signals are used by the pan-tilt mechanism to re-position the second scope from its current target position so as to move towards the target position defined by the current target position data received from the first scope.

2. The system of claim 1 wherein the pan-tilt mechanism, which the second scope is mounted to, is mounted to or integrated into a vehicle.

3. The system of claim 1 wherein the second scope and its pan-tilt mechanism are mounted on a fixed tower.

4. The system of claim 1 further comprising:
(c) a drone, wherein the pan-tilt mechanism, which the second scope is mounted to, is part of the drone.

5. The system of claim 1 further comprising:
(c) a drone, wherein the first scope is part of a drone.

6. A system for tracking a presumed target using scopes that are remotely located from each other, the presumed target having a target position, the system comprising:
(a) a first scope mounted to a pan-tilt mechanism, wherein the first scope is positionable via automatic movement of the pan-tilt mechanism, and wherein the first scope is used to locate the presumed target, the first scope including:
(i) a first plurality of measurement devices, and
(ii) a first processor configured to:
(A) identify current target position data regarding the presumed target that is located by the first scope, the current target position data being identified using the first plurality of measurement devices in the first scope, and
(B) electronically communicate the current target position data regarding the presumed target identified by the first scope to a computer via an electronic network; and
(b) a second scope including:
(i) a second plurality of measurement devices, and
(ii) a second processor configured to:
(A) identify current target position data of the second scope's current target position using the second plurality of measurement devices in the second scope;
(B) communicate with the computer via the electronic network to receive the current target position data regarding the presumed target identified by the first scope;
(C) calculate, using its current target position data and the current target position data received from the first scope, position movements that are required to move the second scope from its current target position to the target position of the presumed target identified by the first scope,
wherein the position movements are used to re-position the second scope from its current target position so as to move towards the target position defined by the current target position data of the presumed target identified by the first scope.

7. The system of claim 6 wherein the processor of the second scope is further configured to:
(D) use the position movements to electronically generate indicators for use by an operator of the second scope to manually re-position the second scope from its current target position to move towards the target position defined by the current target position data of the presumed target identified by the first scope.

8. The system of claim 6 wherein second scope is also mounted to a pan-tilt mechanism, and the processor of the second scope is further configured to:
(D) output electronic control signals for use by the second scope to make the position movements,
wherein the electronic control signals are used by the pan-tilt mechanism to re-position the second scope from its current target position so as to move towards the target position defined by the current target position data of the presumed target identified by the first scope.

9. The system of claim 6 wherein the automatic movement of the pan-tilt mechanism of the first scope is operator-controlled via an operator-controlled input device.

10. The system of claim 6 wherein the first scope locates the presumed target by scanning the surveillance environment via the automatic movement of the pan-tilt mechanism, and wherein the first processor is configured to identify the current target position data regarding the presumed target that is located by the first scope during the automatic movement of the pan-tilt mechanism by:
(I) identifying a target that is desired to be located by the first scope, and
(II) performing object classification on objects within a field-of-view of the first scope to identify the target, wherein the identified target becomes the presumed target.

11. A system for tracking a plurality of presumed targets in a surveillance environment, each presumed target having a respective target position, the system comprising:
(a) a first set of scopes in the surveillance environment for locating a plurality of presumed targets, each of the first set of scopes including:
(i) a first plurality of measurement devices,
(ii) a first processor configured to:
(A) identify current target position data of each of the presumed targets located by the respective scope in the first set of scopes, the current target position data being identified using the first plurality of measurement devices of the respective scope in the first set of scopes, and
(B) electronically communicate the current target position data regarding each of the presumed targets located by the respective scope in the first set of scopes to a computer via an electronic network; and (b) a second set of scopes in the surveillance environment for following one or more of the presumed targets identified by the first set of scopes, each of the second set of scopes being in electronic communication with the computer via the electronic network for receiving the current target position data of the plurality of presumed targets identified by the first set of scopes, each of the second set of scopes including:
  (i) a second plurality of measurement devices, and
  (ii) a processor configured to:
    (A) identify current target position data of the second scope's current target position using the second plurality of measurement devices in the second scope,
    (B) calculate, using its current target position data and the target position data received from the first scope, position movements that are required to move the second scope from its current target position to the target position of one of the presumed targets identified by one of the first set of scopes,
  wherein the position movements are used to re-position the second scope from its current target position to move towards the target position defined by the current target position data of one of the presumed targets identified by one of the first set of scopes.

12. The system of claim 11 wherein the processor of at least one of the second scopes is further configured to:
  (C) use the position movements to electronically generate indicators for use by an operator of the at least one of the second scopes to manually re-position the at least one of the second scopes from its current target position to move towards the target position defined by the current target position data of one of the presumed targets identified by one of the first set of scopes.

13. The system of claim 11 wherein at least one of the second set of scopes is mounted to a pan-tilt mechanism, and the processor of the least one of the second set of scopes is further configured to:
  (C) output electronic control signals for use by the least one of the second set of scopes to make the position movements,
  wherein the electronic control signals are used by the pan-tilt mechanism to re-position the at least one of the second set of scopes from its current target position to move towards the target position defined by the current target position data of one of the presumed targets identified by one of the first set of scopes.

14. The system of claim 11 wherein the processor is further configured to:
  (C) automatically select one of the presumed targets identified by one of the first set of scopes for following by one of the second set of scopes.

15. A system for tracking a presumed target using scopes that are remotely located from each other, wherein the presumed target has a target position, the system comprising:
  (a) a first scope including:
    (i) a first plurality of measurement devices configured to provide current target position data of the first scope, and
    (ii) a first processor configured to:
      (A) identify current target position data regarding a presumed target that is located by the first scope, the current target position data being identified using the plurality of measurement devices in the first scope, and
      (B) electronically communicate the current target position data regarding the presumed target identified by the first scope to another scope via an electronic network;
  (b) a second scope mounted to or integrated into a vehicle, the vehicle initially being at a first location, the second scope including:
    (i) a second plurality of measurement devices configured to provide current target position data of the second scope,
    (ii) a second processor configured to:
      (A) receive the current target position data regarding the presumed target identified by the first scope via the electronic network, and
      (B) calculate a second location that allows the second scope to view the presumed target using the current target position data received from the first scope regarding the presumed target; and
  (c) mapping software executing in a computer and configured to calculate, using the first location and the second location, position movement instructions for moving the vehicle from the first location to the second location, wherein an output of the mapping software is in electronic communication with the vehicle so as to communicate the position movement instructions to the vehicle;
  wherein the second processor is further configured to:
    (C) identify current target position data of the second scope's current target position using the plurality of measurement devices in the second scope,
    (D) calculate, using its current target position data and the current target position data of the presumed target identified by the first scope, position movements that are required to move the second scope from its current target position to the target position of the presumed target identified by the first scope, and
    (E) output electronic control signals for use by the second scope to make the position movements,
  wherein the second scope uses the electronic control signals to re-position the second scope from its current target position so as to move towards the target position defined by the current target position data received from the first scope, and the position movement instructions are used to move the vehicle from the first location towards the second location.

16. A system for tracking a presumed target using scopes that are remotely located from each other, wherein the presumed target has a target position, the system comprising:
  (a) a first scope including:
    (i) a first plurality of measurement devices configured to provide current target position data of the first scope, and
    (ii) a first processor configured to:
      (A) identify current target position data regarding a presumed target that is located by the first scope, the current target position data being identified using the plurality of measurement devices in the first scope, and
      (B) electronically communicate the current target position data regarding the presumed target identified by the first scope to another scope via the electronic network;

(b) a second scope mounted to or integrated into a vehicle, the vehicle initially being at a first location, the second scope including a second processor configured to:
  (A) receive the current target position data regarding the presumed target identified by the first scope via the electronic network, and
  (B) calculate a second location that allows the second scope to view the presumed target using the current target position data received from the first scope regarding the presumed target; and
(c) mapping software, executing in a computer and configured to calculate, using the first location and the second location, position movement instructions for moving the vehicle from the first location to the second location,
  wherein the mapping software is also in electronic communication with the vehicle so as to communicate the position movement instructions to the vehicle so that the position movement instructions may be used to move the vehicle from the first location towards the second location.

17. The system of claim 16 wherein, when the presumed target is a person, and the second scope has a known minimum distance that allows an image obtained from the second scope to capture sufficient facial features to allow a facial recognition algorithm to create a usable facial signature of the person from the image obtained from the second scope, and wherein the second location is further calculated so as to be the minimum distance or less to the presumed target.

18. The system of claim 17 wherein the second scope has a positioning angle with respect to the person so as to be within a predefined viewing angle of the person's face, and wherein the second location is further calculated so as to allow the second scope to be within the predefined viewing angle.

19. The system of claim 17 wherein the minimum distance is 150 meters or less from the presumed target.

20. The system of claim 16 wherein the first processor is configured to identify the current target position data regarding the presumed target that is located by the first scope by:
  (I) identifying a target that is desired to be located by the first scope, and
  (II) performing object classification on objects within a field-of-view of the first scope to identify the target, wherein the identified target becomes the presumed target.

21. The system of claim 16 wherein the vehicle is a drone, and the second scope is mounted to or integrated into the drone.

22. The system of claim 16 wherein the vehicle is a land-based vehicle, and the second scope is mounted to or integrated into the land-based vehicle.

* * * * *